(12) United States Patent
Wigren et al.

(10) Patent No.: US 12,212,385 B2
(45) Date of Patent: Jan. 28, 2025

(54) DYNAMIC ELECTROMAGNETIC FIELD COORDINATION OF MULTIPLE CARRIERS

(71) Applicant: Telefonaktiebolaget LM Ericsson (publ), Stockholm (SE)

(72) Inventors: Torbjörn Wigren, Uppsala (SE); Shiguang Guo, Kanata (CA); Ken Huisman, Stittsville (CA); Christer Törnevik, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/004,724

(22) PCT Filed: Jul. 10, 2020

(86) PCT No.: PCT/IB2020/056531
§ 371 (c)(1),
(2) Date: Jan. 9, 2023

(87) PCT Pub. No.: WO2022/008962
PCT Pub. Date: Jan. 13, 2022

(65) Prior Publication Data
US 2023/0254017 A1    Aug. 10, 2023

(51) Int. Cl.
*H04B 7/0426* (2017.01)
*H04B 7/024* (2017.01)
*H04B 7/06* (2006.01)

(52) U.S. Cl.
CPC ........... *H04B 7/0426* (2013.01); *H04B 7/024* (2013.01); *H04B 7/061* (2013.01)

(58) Field of Classification Search
CPC ...... H04B 7/0426; H04B 7/024; H04B 7/061; H04W 24/08; H04W 52/245;
(Continued)

(56) References Cited

U.S. PATENT DOCUMENTS

2010/0202431 A1* 8/2010 Kazmi ................... H04B 7/068
375/267
2014/0362951 A1* 12/2014 Fehri .................... H04B 1/0475
375/297
(Continued)

FOREIGN PATENT DOCUMENTS

| WO | WO-2016001781 A1 * | 1/2016 | .......... H04B 1/0475 |
| WO | 2020/073191 A1 | 4/2020 | |
| WO | 2020/222682 A1 | 11/2020 | |

OTHER PUBLICATIONS

International Search Report and Written Opinion dated Feb. 22, 2021 issued in PCT Application No. PCT/IB2020/056531, consisting of 15 pages.
(Continued)

*Primary Examiner* — Jean B Corrielus
(74) *Attorney, Agent, or Firm* — Weisberg I.P. Law, P.A.

(57) ABSTRACT

According to one or more embodiments, a network node is provided. The network node includes processing circuitry configured to: feedback a total momentary carrier power associated with a plurality of co-sited carriers for controlling a respective power of each of the plurality of co-sited carriers. Further, according to one or more embodiments, a method performed by a network node is provided. The method includes feeding back a total momentary carrier power associated with a plurality of co-sited carriers for controlling a respective power of each of the plurality of co-sited carriers.

16 Claims, 14 Drawing Sheets

(58) Field of Classification Search
CPC . H04W 52/247; H04W 52/386; H04W 52/42; H04W 52/143; H04W 24/02; H04W 52/225; H04W 52/362
See application file for complete search history.

(56) References Cited

U.S. PATENT DOCUMENTS

| | | |
|---|---|---|
| 2018/0167897 A1 | 6/2018 | Sampath et al. |
| 2018/0198424 A1* | 7/2018 | Sharma ............... H03F 3/45188 |
| 2021/0006210 A1* | 1/2021 | Suzuki .................. G01R 23/20 |
| 2021/0337559 A1* | 10/2021 | Wigren ............... H04W 52/223 |

OTHER PUBLICATIONS

IEC TR 62669 ED2: Case Studies Supporting IEC 62232—Determination of RF Field Strength and SAR in the Vicinity of Radiocommunication Base Stations for the Purpose of Evaluating Human Exposure; Draft Technical Report (DTR) 106/473/DTR; Dec. 7, 2018, consisting of 122 pages.

Thors Bjorn et al., Time-Averaged Realistic Maximum Power Levels for the Assessment of Radio Frequency Exposure for 5G Radio Base Stations Using Massive MIMO; IEEE Access; Oct. 12, 2017, consisting of 10 pages.

* cited by examiner

DYNAMIC ELECTROMAGNETIC FIELD COORDINATION OF MULTIPLE CARRIERS

CROSS-REFERENCE TO RELATED APPLICATION

This application is a Submission Under 35 U.S.C. § 371 for U.S. National Stage Patent Application of International Application Number: PCT/IB2020/056531, filed Jul. 10, 2020 entitled "DYNAMIC ELECTROMAGNETIC FIELD COORDINATION OF MULTIPLE CARRIERS," the entirety of which is incorporated herein by reference.

TECHNICAL FIELD

Wireless communication and in particular, dynamic radio frequency (RF) electromagnetic field (EMF) coordination of multiple carriers.

BACKGROUND

When radio equipment is to be deployed, radio frequency (RF) electromagnetic field (EMF) exposure limitations such as regulatory limitations need to be accounted for. These exposure limitations are typically based on the guidelines from standards organizations such as the International Commission on Non-Ionizing Radiation Protection (ICNIRP), but may take different forms in some countries and regions. The aim of these exposure limitations is to ensure that the human exposure to RF energy is kept within safe limits, which have been set with wide safety margins. The RF EMF exposure limits are typically expressed in terms of a power density limit (W/).

The implementation of advanced antenna systems (AASs) in network nodes and radios provides some benefits but may also complicate site design within the context of these exposure limitations. For example, the AASs increase the capacity and/or coverage of existing wireless systems by addition of an antenna array. This enables the simultaneous transmission of parallel data streams between a network node and a wireless device, which is referred to as multiple-input-multiple-output (MIMO) transmission. In some cases such as when mmW carrier frequencies are used, one desired effect is to enhance coverage by exploiting the high beamforming gain of the AASs.

A consequence of the increasing beamforming gain is that the radiated power is increasingly concentrated in beams. Therefore, the maximum Equivalent Isotropic Radiated Power (EIRP) of the network node is increased as compared to the situation without AAS. As a further consequence, the traditionally used methods for calculation of RF EMF compliance distances and exclusion zones based on the maximum EIRP of the network node, tend to generate increased compliance distances and exclusion zones. This increases the deployment challenges. The use of the maximum momentary EIRP may be overly conservative, since the radio transmissions are not pointed in the same direction for long periods of time, the direction rather varies rapidly, thereby distributing the radiated power spatially. This fact may be used in benefit of wireless communication network operators when requesting functionality for reduction of safety distances and exclusion zones as compared to ones based on the maximum momentary EIRP, while strictly maintaining compliance with RF EMF exposure regulations.

More specifically, the ICNIRP and other RF EMF exposure limitations are expressed as the average power density over a specified time interval T. This power averaging may provide a possibility to obtain the requested reductions. Given a distance, the average power density limit can be transformed to a corresponding average power limit for the average total transmitted power. In cases where time averaged RF EMF exposure limitations may be applied, the momentary power can be significantly higher than an average power threshold during time intervals shorter than T, however the transmitted average power must be guaranteed to be below the configured threshold that the operator applies for the exclusion zone, for all times and for all sorts of traffic. Thus, to implement an RF EMF exclusion zone smaller than what is obtained using the maximum EIRP of the AAS equipped network node, a control functionality is needed that guarantees the average power over time T is below the threshold 100% of the time. One solution in existing systems is to configure a fixed threshold as a percentage of the fixed maximum transmit power (i.e., fixed percentage of output power) of a node that is selected/computed together with the exclusion zone, and then used for regulation of the average transmit power of cells controlled by the network node.

However, an additional problem appears when AAS equipped network nodes/radios are co-located, with overlapping antenna patterns, a situation referred to as "co-siting". In cases where the antenna systems are also co-sited (at very close geographic locations and with the same or very similar bore-sight directions), or in cases where AASs are shared by more than one network node/radio, the sum of the EIRPs of the network nodes/radios affects the exclusion zone. A consequence is a corresponding increase of the size of the exclusion zone. This may be troublesome for network operators since deployment becomes even more challenging. It may, for example, become impossible to re-use previous cell sites in an urban area with narrow streets.

Further, the average power threshold that is associated with the exclusion zone in existing systems is provided on a per carrier controlled basis by a network node, or even on a per beam of a carrier controlled basis by a network node. In cases of such intra network node carrier co-siting, these existing systems use a static/fixed division of the sum of EIRPs (i.e., fixed set powers), between the co-sited carriers, to determine multiple thresholds that together are related to the exclusion zone. Then, to be able to reduce the exclusion zone to a desired size, the threshold of each carrier may need to be further reduced, as compared to a non co-siting implementation. A consequence may be that the average power control loops of each single carrier may need to reduce the power more often than in a non co-siting situation, which in turn leads to corresponding reductions of the throughput of each carrier. This associated reduction of throughput is a concern for operators. For mmW network nodes, the problem becomes significant, considering that each mmW network node may control multiple carriers such as, for example, up to 8 carriers. Also, for LTE and NR LB/HB network nodes, the problem may be significant with multiple carriers such as, for example, 6 carriers being possible for LTE and multiple carriers such as, for example, 5 carriers being possible for NR.

SUMMARY

Some embodiments advantageously provide a method and system for RF EMF coordination of multiple carriers.

One or more embodiments described herein advantageously provide one or more of:
  multi-carrier control objectives, for carrier aggregation and/or mixed mode radio.

A coordinating average EIRP control mechanism.

Momentary power measurement mechanisms combining powers from multiple radio circuits, e.g., multiple radio ASICs.

Therefore, one or more embodiments described herein provide for an enhanced throughput of AAS radios (i.e., one or more AAS network nodes) running co-sited individual carriers. In addition, the main configuration problem of the single carrier average power control loops is reduced to a configuration of one average EIRP threshold associated with the exclusion zone. Further, one or more embodiments described herein have a low implementation complexity as compared with existing solutions, and are able to provide "smart" or automated configuration of single carrier controllers to provide dynamic power/emissions control.

According to one aspect of the disclosure, a network node is provided. The network node includes processing circuitry configured to feedback a total momentary carrier power associated with a plurality of co-sited carriers for controlling a respective power of each of the plurality of co-sited carriers. According to one or more embodiments of this aspect, the processing circuitry is further configured to configure a plurality of scaling values where each scaling value is associated with a respective one of the plurality of co-sited carriers and being configured to scale the total momentary carrier power for generating a respective scaled average total power for controlling the respective power of the plurality of co-sited carriers. According to one or more embodiments of this aspect, each scaling value is a respective fraction of an average total power associated with the plurality of co-sited carriers, the average total power being based at least on the total momentary carrier power.

According to one or more embodiments of this aspect, each scaling value is a proportional value of a long term average load for a respective carrier. According to one or more embodiments of this aspect, the feedback of the total momentary carrier power is configured to be provided to a plurality of average power control loops that are each configured to control a power of a respective one of the plurality of co-sited carriers and each configured to operate independent from each other. According to one or more embodiments of this aspect, the total momentary carrier power is based on a total power associated with a plurality of radio circuits that are each configured to control a power of a respective one of the plurality of co-sited carriers.

According to one or more embodiments of this aspect, the feedback of the total momentary carrier power is configured to allow a total average power of the plurality of carriers to be maintained below a threshold. According to one or more embodiments of this aspect, the feedback of the total momentary carrier power is configured to allow a respective dynamic power budget for each carrier. According to one or more embodiments of this aspect, the respective power of each of the plurality of co-sited carriers is a respective average power of each of the plurality of co-sited carriers.

According to another aspect of the disclosure, a network node is provided. The network node includes processing circuitry configured to: receive feedback of a total momentary carrier power associated with a plurality of co-sited carriers, and control a power of a first carrier of the plurality of co-sited carriers based at least on the total monetary carrier power. According to one or more embodiments of this aspect, the processing circuitry is further configured to: receive a scaling value for scaling the total momentary carrier power; and generate a scaled average total power based at least on the scaled total momentary carrier power where the control of the power of the first carrier is based at least on the scaled average total power. According to one or more embodiments of this aspect, the scaling value is a proportional value of a long term average load for a respective carrier.

According to one or more embodiments of this aspect, the processing circuitry is further configured to operate an average power control loop for controlling the power of first carrier based at least on the total momentary carrier power where the average power control loop is configured to operate independent of at least one other average power control loop associated with at least one other co-sited carrier of the plurality of co-sited carriers. According to one or more embodiments of this aspect, the total momentary carrier power is based on a total power associated with a plurality of radio circuits, a first radio circuit of the plurality of radio circuits being configured to control a power of the first carrier. According to one or more embodiments of this aspect, the feedback of the total momentary carrier power is configured to allow a total average power of the plurality of carriers to be maintained below a threshold. According to one or more embodiments of this aspect, the feedback of the total momentary carrier power is configured to allow a dynamic power budget for the first carrier. According to one or more embodiments of this aspect, the power of the first carrier is an average power.

According to another aspect of the disclosure, a method for a network node is provided. A total momentary carrier power associated with a plurality of co-sited carriers is fed back for controlling a respective power of each of the plurality of co-sited carriers. According to one or more embodiments of this aspect, a plurality of scaling values are configured where each scaling value being associated with a respective one of the plurality of co-sited carriers and being configured to scale the total momentary carrier power for generating a respective scaled average total power for controlling the respective power of the plurality of co-sited carriers. According to one or more embodiments of this aspect, each scaling value is a respective fraction of an average total power associated with the plurality of co-sited carriers where the average total power is based at least on the total momentary carrier power.

According to one or more embodiments of this aspect, each scaling value is a proportional value of a long term average load for a respective carrier. According to one or more embodiments of this aspect, the feedback of the total momentary carrier power is configured to be provided to a plurality of average power control loops that are each configured to control a power of a respective one of the plurality of co-sited carriers and each configured to operate independent from each other. According to one or more embodiments of this aspect, the total momentary carrier power is based on a total power associated with a plurality of radio circuits that are each configured to control a power of a respective one of the plurality of co-sited carriers.

According to one or more embodiments of this aspect, the feedback of the total momentary carrier power is configured to allow a total average power of the plurality of carriers to be maintained below a threshold. According to one or more embodiments of this aspect, the feedback of the total momentary carrier power is configured to allow a respective dynamic power budget for each carrier. According to one or more embodiments of this aspect, the respective power of each of the plurality of co-sited carriers is a respective average power of each of the plurality of co-sited carriers.

According to another aspect of the disclosure, a method implemented by a network node is provided. Feedback of a total momentary carrier power associated with a plurality of co-sited carriers is received. A power of a first carrier of the plurality of co-sited carriers is controlled based at least on the total monetary carrier power.

According to one or more embodiments of this aspect, a scaling value for scaling the total momentary carrier power is received. A scaled average total power is generated based at least on the scaled total momentary carrier power where the control of the power of the first carrier is based at least on the scaled average total power. According to one or more embodiments of this aspect, the scaling value is a proportional value of a long term average load for a respective carrier. According to one or more embodiments of this aspect, an average power control loop is operated for controlling the power of first carrier based at least on the total momentary carrier power where the average power control loop is configured to operating independent of at least one other average power control loop associated with at least one other co-sited carrier of the plurality of co-sited carriers.

According to one or more embodiments of this aspect, the total momentary carrier power is based on a total power associated with a plurality of radio circuits, a first radio circuit of the plurality of radio circuits being configured to control a power of the first carrier. According to one or more embodiments of this aspect, the feedback of the total momentary carrier power is configured to allow a total average power of the plurality of carriers to be maintained below a threshold. According to one or more embodiments of this aspect, the feedback of the total momentary carrier power is configured to allow a dynamic power budget for the first carrier. According to one or more embodiments of this aspect, the power of the first carrier is an average power.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Several general aspects related to control functionality and emissions control are described below.

Automatic Control

A dynamic process is one where the output depends not only on the present input signal but also of previous inputs and outputs. In other words, the dynamic process has memory. One dynamic process is a linear dynamic process that can be described by a differential equation as $$y^{(n)}(t)+\alpha_1 y^{(n-1)}(t)+ \ldots +\alpha_n y(t)=b_0 u^{(m)}(t)+ \ldots b_m u(t)$$

Here y(t) is the output signal, u(t) is the input signal, t is the time, while $\alpha_i$ i=1 ... n and $b_j$ j=0, ..., m are constant parameters. (denotes differentiation with respect to time i times. The above differential equation has order n. It has one input signal and one output signal. For simplicity all concepts are explained in this context, but the generalization to more than one input signal and more than one output signal is applicable.

By taking Laplace transforms and setting initial values to zero, the differential equation is transformed to be represented by a transfer function H(s), where s denotes the Laplace transform variable which is closely related to the angular frequency used in Fourier transforms. The result is $$H(s) = \frac{B(s)}{A(s)} = \frac{b_0 s^m + b_1 s^{m-1} + \ldots + b_m}{s^n + a_1 s^{n-1} + \ldots + a_n}.$$

The relation between the output signal and input signal Laplace transforms Y(s) and U(s) are $$Y(s)=H(s)U(s)$$

The poles $P_i$, i=1, ..., n of the process are given by the equation A(s)=0. For simplicity only strictly stable (open loop) processes with all poles in the left complex half plane is considered here. In general, poles are real or complex conjugate pairs.

The properties of the dynamic process can also be studied in the frequency domain in terms of complex valued frequency functions Y(jω), H(jω) and U(jω). ω denotes the angular frequency that fulfils $$\omega=2\pi f,$$

where $f$ is the frequency in Hz. Below, frequency is used for angular frequency.

Figure 1:
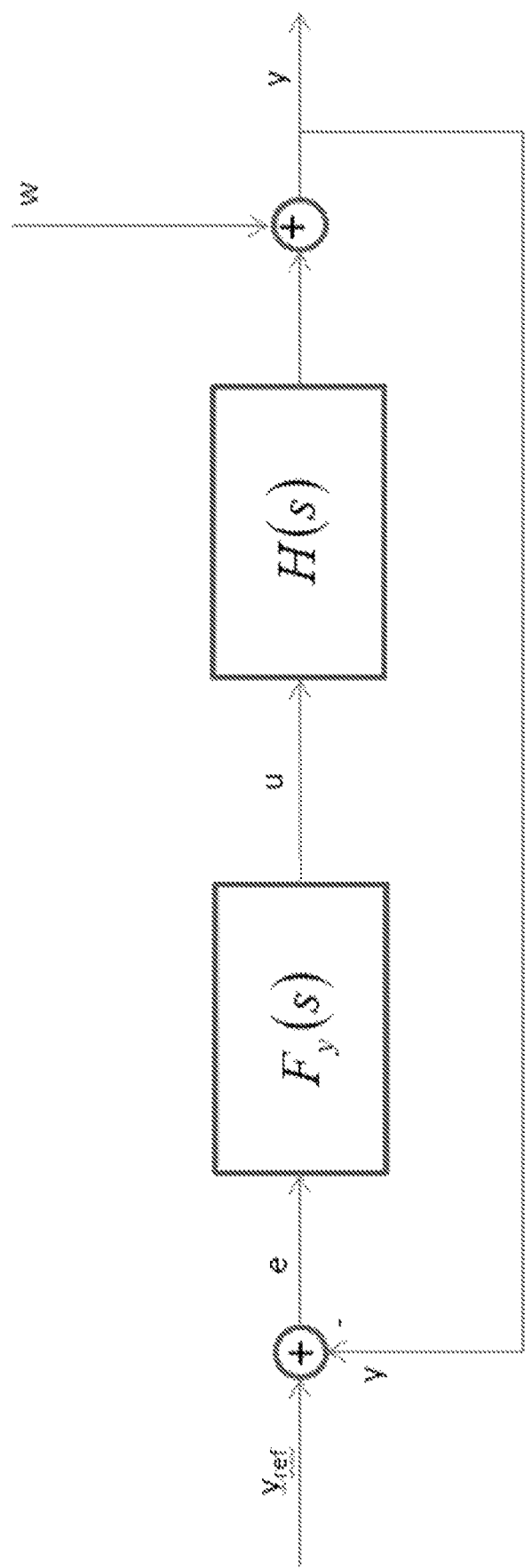
FIG. 1 is a block diagram illustrated feedback.

The following definitions are explained with respect to FIG. 1, where $F_y(s)$ is the feedback gain. The closed loop system is then computed as follows $$Y(s)=W(s)+H(s)F_y(s)(Y_{ref}(s)-Y(s)),$$

which gives $$Y(s) = \frac{F_y(s)H(s)}{1+F_y(s)H(s)} Y_{Ref}(s) + \frac{1}{1+F_y(s)H(s)} W(s).$$

This gives the effect of the reference signal and the disturbance on the output. The remaining definitions now follow as The closed loop bandwidth $\omega_{CL}$ of the control system is given by the equation $$\left|\frac{F_y(j\omega_{CL})H(j\omega_{CL})}{1+F_y(j\omega_{CL})H(j\omega_{CL})}\right|^2 = \frac{1}{2}\left|\frac{F_y(0)H(0)}{1+F_y(0)H(0)}\right|^2.$$

The closed loop static error of the control system is given by the equation $$y_{ref} - y = \frac{1}{1+F_y(0)H(0)}(y_{ref} - w),$$

Next, the PI controller is described, starting with integrating control. The idea of integrating control is to compute the control signal from the integral of the control error. The magnitude of the control signal may increase whenever there is a remaining control error with constant sign. This means that the actuator may act increasingly hard to remove the control error. If the dynamics are linear, the only way a steady state solution can be achieved is when the integrating controller steers the control error to zero, in which case $$y_{ref} = y.$$

This property holds when the control system is stable, irrespective of the dynamics of the un-controlled system. On the negative side, integrating control reduces stability margins which is the reason why PI control applies a mix of proportional and integrating control, using the dynamic controller $$F_y(s) = \left(C_1 + \frac{1}{T_I}\frac{1}{s}\right).$$

Here $C_1$ is the proportional gain and $T_I$ the integration time. 1/s is the Laplace transform of an integration operation in the time domain. It can be noted that since the controller has two free tuning parameters, the proportional gain and the integration time, arbitrary pole locations can be assigned to any second order feedback loop. Such pole-placement design may be applied to determine the controller in the average power control loop.

Single Carrier Average Power Control

Some systems use average power/average EIRP controllers suitable for control of a single carrier, i.e., for situations without co-siting. A general version of this type of control is described below.

Factored Out Integration Operation

Figure 2:
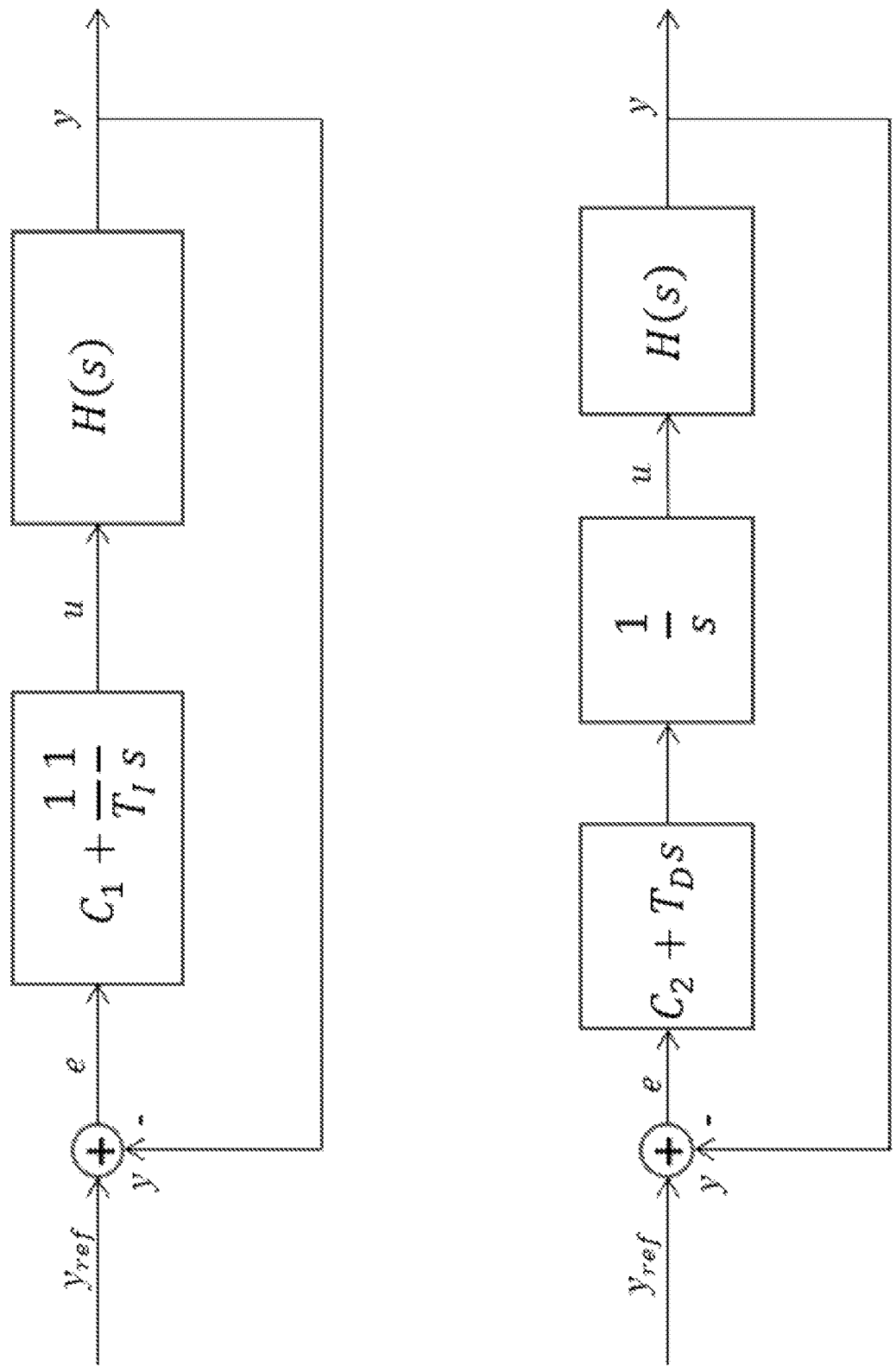
FIG. 2 is a block diagram of two versions of PI control.

The average power controller may make use of the lower realization of proportional integral (PI) control in FIG. 2. That realization factors out an integrator. The factored out integrator may be placed in or close to the scheduler of a network node, to produce the dynamics of the resource limiting threshold. As illustrated in FIG. 2, the remaining dynamics of the PI-controller resembles a proportional term and a differentiating term. Hence, the solution that applied average power back-off control is proportional derivative (PD) control together with an integrating resource limiting threshold. The relation between the parameter of the top and bottom realizations are obtained by equating the coefficients for equal degrees of s in $$C_1 + \frac{1}{T_I}\frac{1}{s} \equiv (C_2 + T_D s)\frac{1}{s} = T_D + C_2\frac{1}{s}.$$

Integrating Fractional Scheduler Threshold

In order to get smooth behavior of the dynamic resource threshold applied in the scheduler to limit the output power, it may need to be rate controlled. This means that the control signal commands adjustments to the limiter, making it increase or decrease. The dynamics of the actuator mechanism (dynamic resource threshold) is therefore determined to be $$\dot{\gamma}(t) = u(t),$$

where $\gamma(t)$ is the dynamic resource threshold and where u(t) is the control signal further discussed below. t denotes continuous time. This is in line with the factored PI control structure of FIG. 2. The dynamic resource threshold is decoupled from the scheduler algorithms and expresses a fractional limitation of the scheduler not to use more than a fraction $\gamma(t)$ of its total resources. The scheduler may then limit the number of frequency resources (physical resource blocks, PRBs) it uses, or limit any other quantity that correlates well with the momentary output power.

Integrating Fractional Scheduler Threshold Limitation

The maximum value of y(t) is 1.0 since it is to express a fraction of the maximum amount of scheduler resources. There may also be a need to limit its lower value, to avoid that the dynamic feedback control mechanism reduces it to an unphysical value below 0.0. The following scheduler threshold limitation is therefore applied at each time.

$$\gamma_{low} \leq \gamma(t) \leq 1.0$$

PD Control

Figure 3:
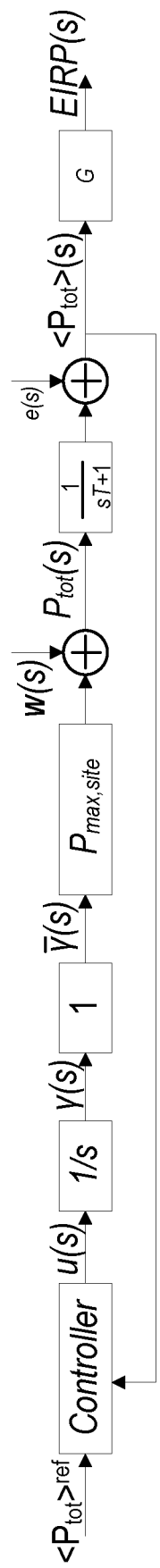
FIG. 3 is a block diagram of feedback control.

FIG. 3 is a diagram showing a feedback control mechanism. FIG. 3 illustrates the case where feedback control has been enabled by the supervision mechanism described below.

In FIG. 3, $\langle P_{tot}\rangle^{ref}$ denotes the setpoint for the averaged power (typically slightly less than the threshold value that has been obtained from the calculations leading the exclusion zone), 1/s denotes the actuator dynamics with lower and upper limits inactive, $\bar{\gamma}(t)$ denotes the scheduler limitation after lower and upper limitation (inactive in FIG. 3), $P_{max,site}$ denotes the maximal total power of the base station, w(t) denotes a disturbance representing predicted power errors, 1/(sT+1) represents an autoregressive simplified model of the averaging of power, $\langle P_{tot}\rangle$(s) denotes the averaged total power, e(s) denotes a measurement error, G denotes the antenna gain and EIRP(s) denotes the EIRP. Note that all quantities are here expressed in the Laplace transform domain, which is allowed since the feedback control mechanism design is performed with constraints inactive. The momentary power described above is denoted $P_{tot}(s)$.

Note: w(s) and e(s) are not a part of the implemented controller, they are only a mathematical approximation of errors in the control loop, useful to assess performance aspects.

It is then assumed that the controller block is given by $$u(s) = CT(1+T_D S)(\langle P_{tot}\rangle^{ref} - \langle P_{tot}\rangle(S)).$$

This controller is of proportional-derivative (PD) type. C denotes the proportional gain, and $T_D$ the differentiation time. Following standard procedures of automatic control, the poles of the closed loop system of FIG. 3 are given by the following second order equation $$S^2 + (1/T + P_{max,site} CT_D)S + P_{max,site} C = 0.$$

These poles govern the closed loop dynamics of the feedback control mechanism, the actuator mechanism, and the averaged power. In order to determine the proportional gain and the differentiation time, a closed loop polynomial with desired poles in $-\alpha_1$ and $-\alpha_2$ is specified as $$s^2+(\alpha_1+\alpha_2)s+\alpha_1\alpha_2=0.$$

An identification of coefficients and a solution of the resulting system of equations reveal that the proportional gain and differentiation time may be selected as $$C = \frac{\alpha_1\alpha_2}{P_{max,site}},$$

$$T_D = \frac{\alpha_1 + \alpha_2 - \frac{1}{T}}{\alpha_1\alpha_2}.$$

A reason for this choice is that a system with two negative real poles can be expected to be well damped, which is a result of a significant differentiation action. Since differentiation action is needed for fast back-off close to the determined threshold, this may be the preferred choice.

Some additional modifications of the controller may be made to adapt to the one-sided power back-off control problem formulation. This includes, for example, only allowing negative differentiation control, and a hard safety limit applied in case the average power gets too close to the regulatory threshold. The asymmetric differentiation can be formulated as $$u(t)=CTe(t)+CTT_D\max(0,\dot{e}(t)).$$

To implement the feedback control mechanism, $\langle P_{tot}\rangle^{ref}$, $\langle P_{tot}\rangle$ (t) and $\langle P_{tot}\rangle$ (t) are needed, which as described below.

Before going into details of the feedback control mechanism, some details on sampling of a continuous time system are provided.

Discretization

The formulation above has been given in continuous time. However, the implementation is to be performed in discrete time. This means that all dynamic parts of the controller and actuator may need to be discretized. The averaging of the momentary power does not need to be discretized since this is performed at sampling rate, either by a recursive computation of the true average, or by applying summation. Thus, the equations of the controller and actuator may need to be discretized. This may be performed with a Euler approximation, however other alternatives like the Tustin approximation could be used as well. The Euler approximation replaces the Laplace transform variable s, with the discrete time approximation of this derivative, i.e., $$s \to \frac{(q_{(T_S)}) - 1}{T_S}$$

Here $T_S$ denotes the sampling period, and $q_{T_S}^{-1}$ is the one step delay operator where a regular sampling in time, with very little jitter, is assumed. Sampling cannot be event based. Therefore, a system clock is needed to drive the discrete time feedback control loop.

Starting with the actuator and using the fact that $$s\gamma(s)=u(s)$$

results in the discrete time equation $$\gamma(t+T_S)=\gamma(t)+T_SU(t).$$

When sampling the PD controller, it is noted that there is no effect on the proportional term, however the error signal needs to be differentiated. Since the reference value is constant it follows that it is the derivative of the average power that needs sampling. It is first noted that because of the differentiation, filtering of this derivative is also needed, according to the equation $$y(s) = \frac{\alpha}{s+\alpha}s(\langle P_{tot}\rangle^{ref} - \langle P_{tot}\rangle(s)) = -\frac{\alpha s}{s+\alpha}\langle P_{tot}\rangle(s)$$

were the filter bandwidth may be selected to $\alpha$=0.05 rad/s. Here the derivative is denoted by y(s). Following the same procedure as for the actuator results in the discrete time equation $$y(t)=y(t-T_S)-\alpha T_S y(t-T_S)-\alpha(\langle P_{tot}\rangle(t)-\langle P_{tot}\rangle(t-T_S)).$$

The discrete time control signal therefore becomes $$u(t)=CT(\langle P_{tot}\rangle(t)^{ref}-\langle P_{tot}\rangle(t)-T_D\max(y(t),0.0))$$

Model Predictive Safety Net

Figure 4:
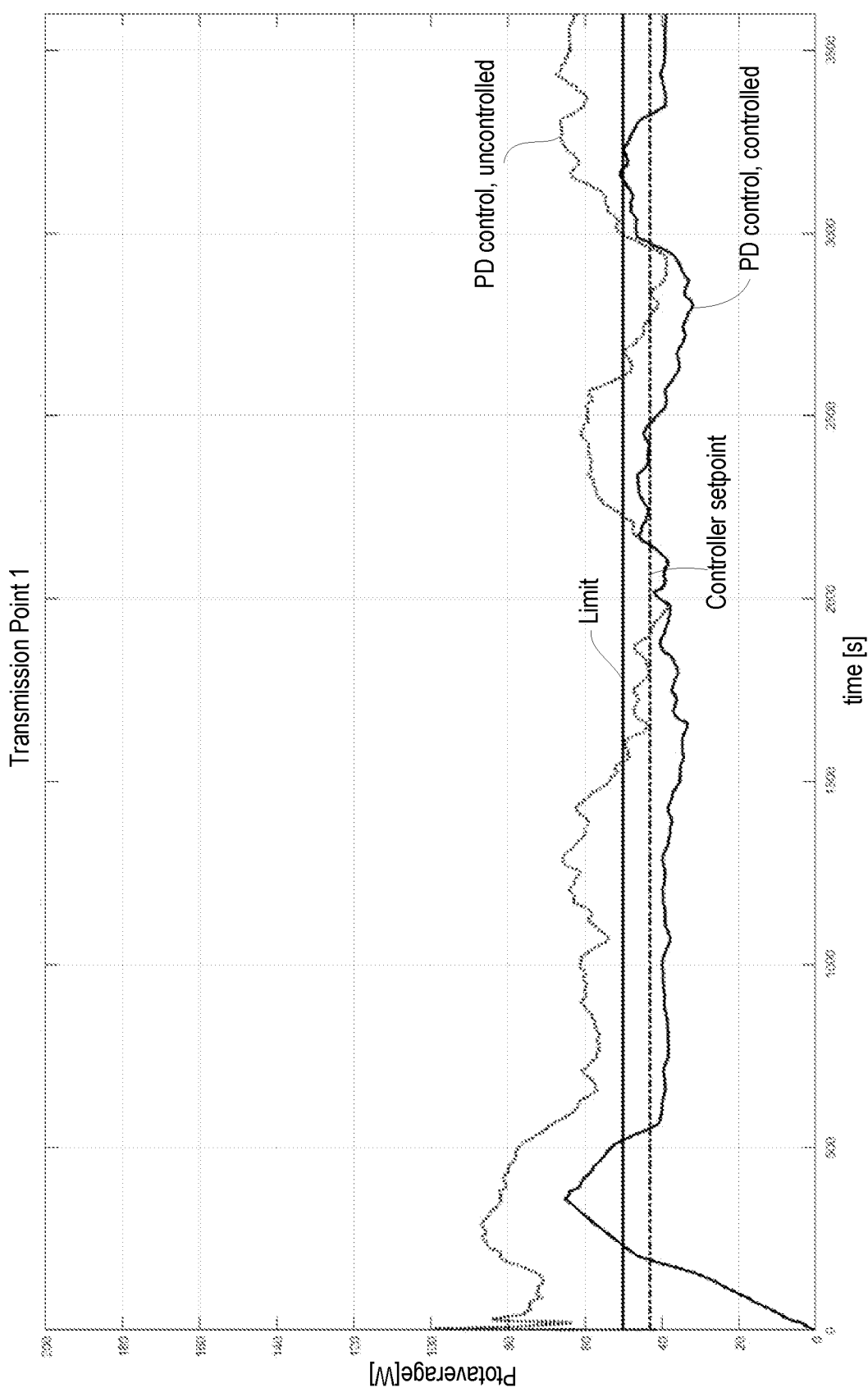
FIG. 4 is a diagram of an example of PD control where an average power threshold is exceeded.

The model predictive time-averaged power control (MPC) algorithm is motivated by the need to guarantee algorithmically that the regulated time-averaged power is always below the threshold computed based on the designed RF EMF exclusion zone of the network node. The functionality described above with respect to existing systems/processes do not have this property. This is because linear control, like PD control, is not designed to provide such guarantees. FIG. 4 is an example where the average power threshold is exceeded using PD control such that there may still be overshoots.

One reason for this effect is that when the averaging window for some reason is first filled with very low momentary powers, followed by very high power such as for 25% of the averaging time, the average power reaches a level close to the threshold. During the remaining averaging time up to T there is a nonzero minimum power entering the window, due, e.g., to PDCCH power, that leads to an increased average power, since the close to zero values in the window initially are shifted out. Hence an overshoot cannot be prevented. This may be a rare situation—however since it can occur it is a regulatory and operator non-negotiable requirement to implement algorithms that prevents this behavior with 100% guarantees. This is one aim of the MPC safety net.

Some Embodiments and Control Signal Selection

To better understand the teachings described herein, a few observations are provided:
  The momentary powers in the sliding window "now", affect the average power T minutes (such as 6 minutes) ahead in time,
  Any action taken to avoid overshoot "now", needs to be evaluated for the coming T to guarantee that there cannot be an overshoot due to the power contents in the window "now".

Some relevant questions for avoiding a threshold violation situation are as follows:

Question: Given a current time to, a power profile $P_{tot}(t)$, $t=t_0 \ldots t_0-(N-1)T_S$ in the sliding window, and a minimum controlled momentary power of $\alpha P_{max,site}$, where $\alpha \in [0,1]$, then what is the maximum possible average relative power during the coming T seconds (N samples), i.e. for $t=t_0+T_S, \ldots, t_0+NT_S$, provided that regulation at future times is performed to limit the power to be less than or equal $\alpha P_{max,site}$?

Provided that a solution to the question can be computed, a guarantee can then be obtained provided that the following control strategy is applied:

If any $\langle P_{tot} \rangle (t_0+iT_S) > \varepsilon P_{max,site} - e$, $i=1, \ldots, N$ then $\gamma(t)=\gamma_{hardlimit}$ where E is the relative power limit, determined from the selected exclusion zone and where $\gamma_{hardlimit} \in [0,1]$ is the hard limit fraction of physical resource blocks (PRBs) that can be scheduled, and were e is a pre-configured margin.

Evaluation of Future Average Powers and Computation of the New MPCtrigger

Figure 5:
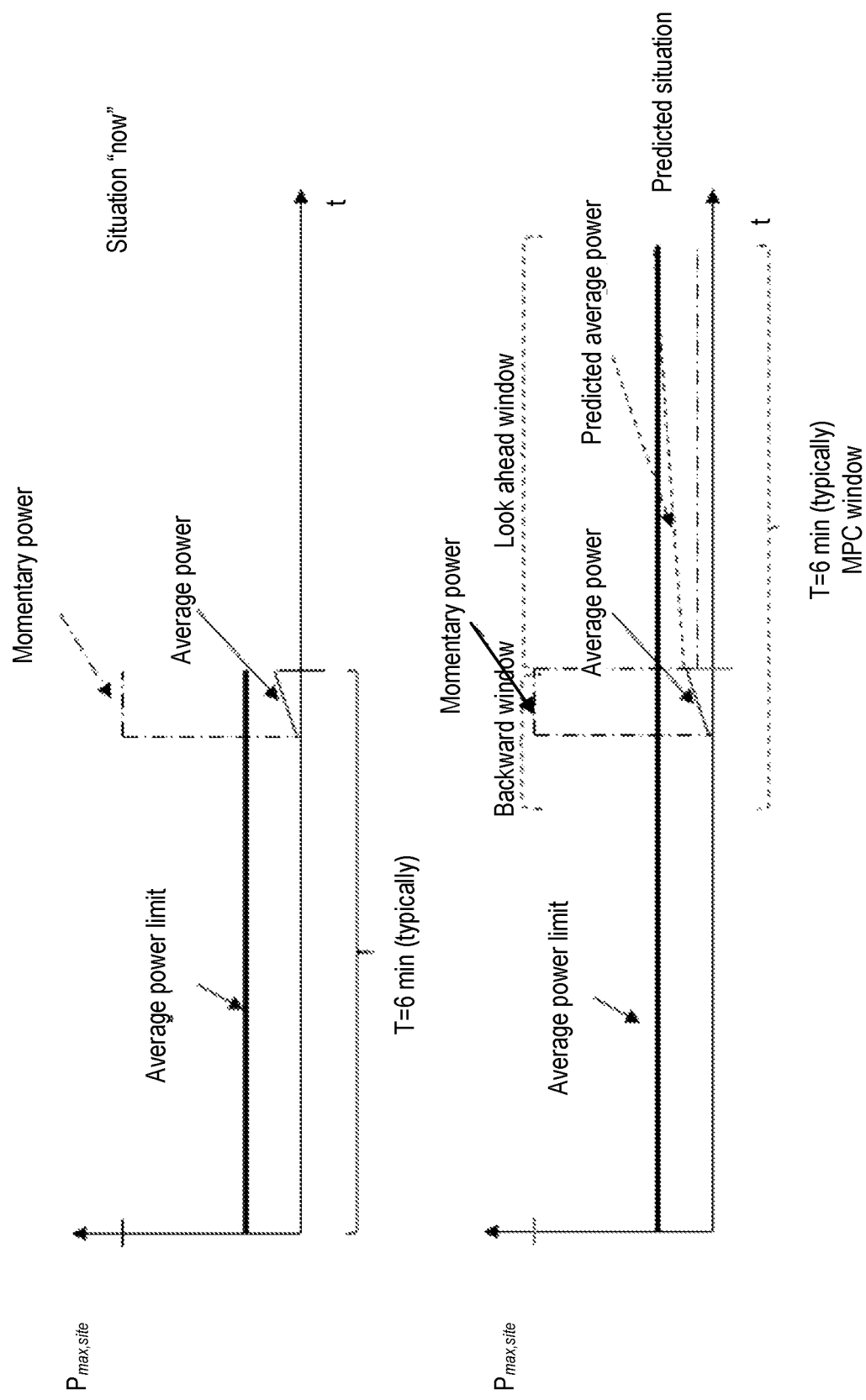
FIG. 5 is a diagram of windows involved in an MPC trigger computation.

The next step is to answer the question, in terms of a computationally efficient algorithm. FIG. 5 is a diagram showing example windows involved in the MPC trigger computation.

One way to compute the average power for future times, is to start by locating the look ahead window to predict a maximum of T ahead in time. In such a situation, there is no contribution from the backward window. Then the windows are moved one sample towards the left, leading to a recursive computation of the sought average power $\langle P_{tot} \rangle$ $(t_0+iT_S)$, $i=1, \ldots, N$.

To outline the details, it follows first that $$\langle P_{tot}(t_0+NT_S) \rangle = N\alpha P_{max,site}.$$

Then for the window positions indexed by $N>i\geq 0$, it follows that $$\langle P_{tot} \rangle (t_0+iT_S) = i\alpha P_{max,site} + P_{tot}(t_0) + \ldots + P_{tot}(t_0+(-i-(N-1))T_S)).$$

The computational complexity can be reduced. Noting that the contribution from the backward window contain the $N-1-i$ last momentary power samples, for $N>i\geq 0$. This means that the sum of power contributions from the backward window can be recursively computed, by introduction of the backward accumulated power $$\langle P_{backward,i} \rangle = \langle P_{backward} \rangle (t_0+(-i-(N-1))T_S) = $$
$$P_{tot}(t_0) + \ldots + P_{tot}(t_0+(-i-(N-1))T_S))$$

This quantity can be recursively computed as follows

```
⟨P_backward,N⟩ = 0
⟨P_tot⟩(t_0 + NT_S) = NαP_max,site
i = N
  While i>2
    i —
      ⟨P_backward,i⟩ = ⟨P_backward,i+1⟩ + P_tot(t_0 + (-i - (N - 1)T_S))
  End
```

The complete recursive algorithm for evaluation of future average power, together with the computation of the Boolean used to trigger predictive back-off using hard limitation, for all times up to T ahead in time therefore becomes:

```
⟨P_backward,N⟩ = 0
⟨P_tot⟩(t_0 + NT_S) = NαP_max,site
MPCtrigger = false
i = N
  while i>2 & ~MPCtrigger
    i —
      ⟨P_backward,i⟩ = ⟨P_backward,i+1⟩ + P_tot(t_0 + (-i - (N - 1)T_S))
      ⟨P_tot⟩(t_0 + iT_S) = iαP_max,site + ⟨P_backward,i⟩
      If ⟨P_tot⟩(t_0 + iT_S) > εP_max,site - e
        MPCtrigger = true
      End if
  End while
```

Power Back Off Triggering

When using the predictive guaranteeing trigger disclosed in the previous subsection, one way of integration into the above logic is the conservative approach given by

```
If MPC trigger == true
    hard limit = true
end
If MPC trigger == false
    hard limit = false
end
```

Numerical Results

Figure 6:
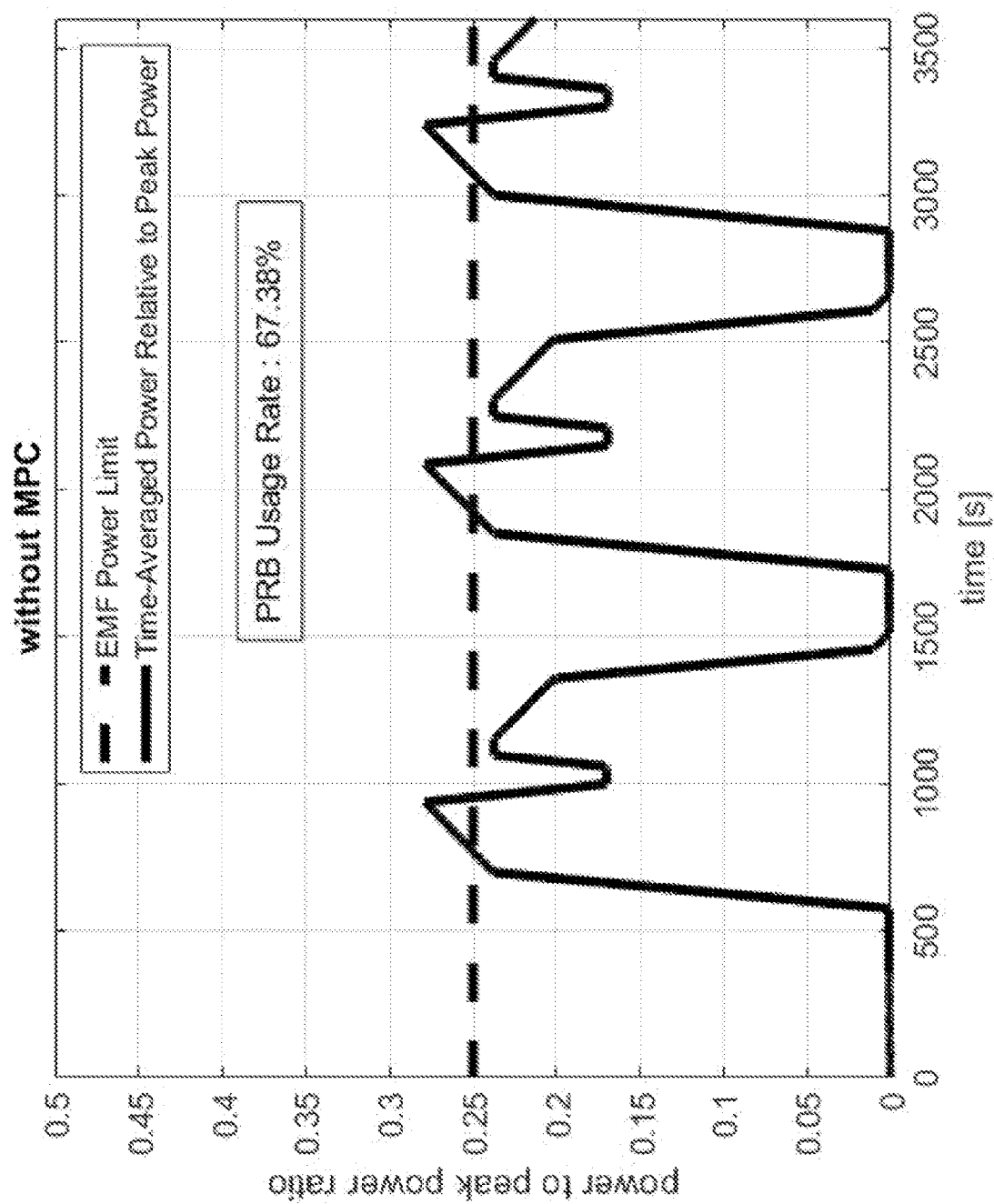
FIG. 6 is a diagram of a time-averaged power without MPC.
Figure 7:
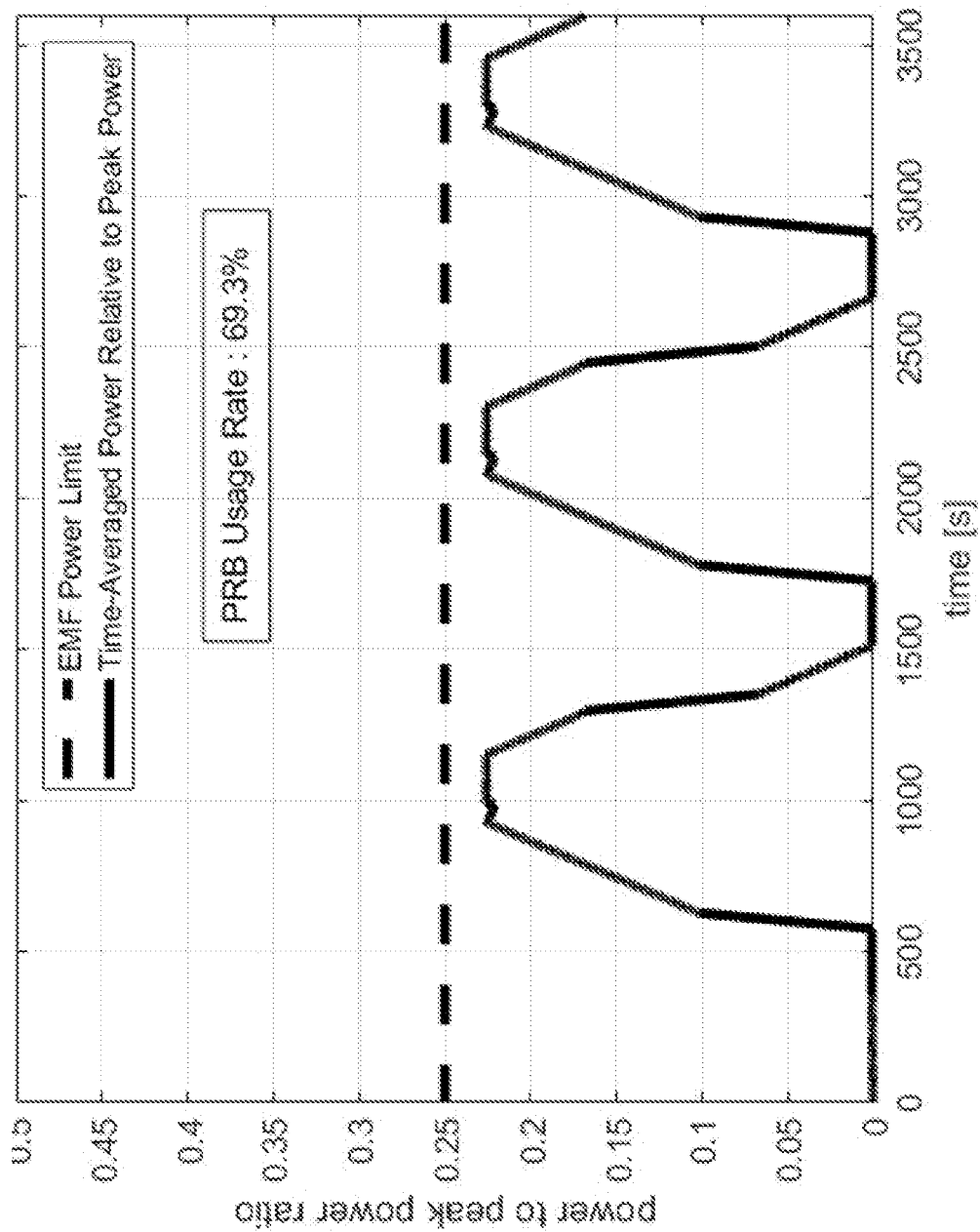
FIG. 7 is a diagram time-averaged power with MPC.

To describe the performance, simulations without (FIG. 6) and with (FIG. 7) the MPC safety net were carried out. It is illustrated in FIG. 6 that the controller consistently prevents the overshoots over the threshold (EMF power limit). The PRB usage rate, which influences throughput and capacity, is comparable with and without PMC.

Radio Circuits

Figure 8:
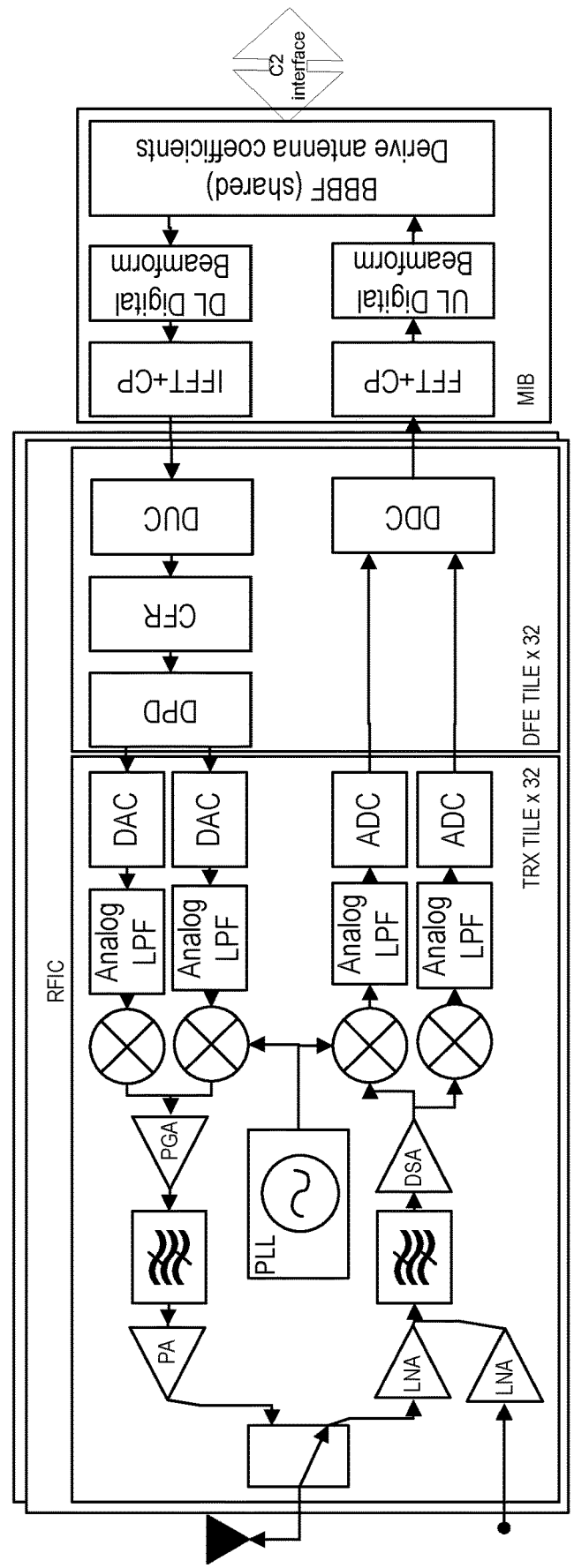
FIG. 8 is a diagram of an analog, mixed mode and digital parts of an mmW radio ASIC.

FIG. 8 is a block diagram of an example of a mmW radio analog and digital radio circuit, such as an Application Specific Integrated Circuit (ASIC), with a transmitter and a receiver.

By connecting one of these radio signal chains to each antenna element, there may be freedom to do arbitrary beamforming in the digital domain. The upper part of the ASIC illustrates the transmitter that includes digital to analog converters (DACs), low pass filters, up-conversion mixers, programmable gain amplifiers, bandpass filters and power amplifiers. The lower part of the ASIC illustrates the receiver that includes a low noise amplifier (LNA), bandpass filters, digital step attenuators, down conversion mixers, lowpass filters and ADCs. In the middle portion there is illustrated a phase locked loop (PLL) that is used to generate the clock required for up/down conversion mixing.

The digital part of the transmission chain starts with reception of the time data streams from the IFFT processing in the central unit. The radio ASCIC then performs digital up-conversion (DUC), crest factor reduction (CFR) and sends the data stream through the digital predistortion block (DPD). After that, data is digital to analogue (DAC) converted. Is it understood that implementation of the radio circuit is not limited solely to ASIC hardware implementations, and that other hardware and/or hardware/software arrangements can be used.

Power Meters

Power Meters Per Signal Chain

The power meters may be located after the CFR blocks illustrated in FIG. 8, before digital pre-distortion (DPD)

takes place. The power meters operate by collection of in-phase and quadrature-phase (IQ) power samples. They may be set up to either Measure IQ signal samples during a predetermined period of time.

Measure a pre-determined number of IQ samples.

However, one way is to measure over a 10 ms long radio frame. This is because of an expected limitation of hardware resources, in terms of power meters. The limited amount of power meters, usable at any given time means that power meters resources may be time shared between signal chains, where one signal chain typically relates to one antenna element. A consequence may be that all signal chains are not measured upon continuously. However, the computed powers at each signal chain is averaged over all radio ASICs. Therefore, even if a preferred sampling interval for the average power controller may be 100 ms, a 10 ms measurement for a single signal chain may be ok due to the law of large numbers.

Representative Power Measurement Means

To obtain "representative" sampled per signal chain momentary powers, functionality that prevents systematic errors may be needed. Such systematic errors could, e.g., occur in case synchronization transmission times would be selected at each time a momentary power is measured. Techniques to prevent such errors include:

Deterministic methods to avoid transmission events that occur at fixed points in time, becoming overrepresented.

Random sampling methods for selection of, e.g., the radio frame selected for momentary power measurement.

The location of the power meter allows for accurate measurement of the power close to the antenna connector, since a closed loop DPD adaptation is performed. Therefore, the transmitted power is sensed via re-use of the receiver parts of the radio ASIC. The DPD is also subject to extensive power sensing internally, to secure accurate operation.

Power Measurement Method Per Signal Chain

The power measurement is typically performed by computation per measurement point in the radio ASIC as follows, by squaring IQ samples:

$$P_{chain,frame} = \frac{1}{N}\sum_{i=1}^{N}[I^2(t_i) + Q^2(t_i)],$$

where N denotes the number of samples during the selected measurement time, $t_i$ denotes the time of each IQ power sample, $I(t_i)$ denotes the in-phase amplitude component and where $Q(t_i)$ denotes the quadrature-phase amplitude component. The obtained power may be used normalized, or unnormalized.

However, carrier aggregation (CA) complicates the use of ASICs. For example, the CA for high band (HB) NR has been standardized (8 carriers) and may be implemented based on TYRA generation 3 radio ASICs. CA for LTE LB/MB may use up to 6 carriers, while LB/MB NR may use 5 carriers. This results in high EIRPs for macro radio configurations, close to or exceeding 70 dBm due to the high antenna gain. Unfortunately, the per-sector carrier Power Lock function sets a fix power budget for each carrier such that the carrier is configured not to exceed the fixed power budget. Another situation where this situation persists is so called mixed mode radio.

Two issues with existing systems are as follows:

With CA, the division of the total RF EMF threshold "budget" between carriers may significantly increase the configuration complexity for network operators, in case carriers are added to increase maximum transmit power or maximum EIRP.

The many conservative per-sector carrier thresholds may compromise the throughput of the system.

Some further issues with existing systems are as follows:

A first issue is that when RF EMF exclusion zones are determined for a cellular site, the average power thresholds per carrier, resulting from the co-sited and boresight aligned antenna system that, e.g., serve multiple carriers, are based on a static division between the co-sited transmitting carriers. The reference value of the average power control loop of each single carrier/single cell average power control loop is then computed based on the thresholds. Since the average powers of the single carrier/single cell control loops are not likely to be high or low at the same times, it follows that a single carrier/single cell control loop with high average power, may need to limit the momentary power and thus the throughput, despite the fact that the total average EIRP threshold is not exceeded due to low average power in other co-sited control loops. Thus, existing control mechanisms are not designed to use this unused headroom.

A second issue is that control objectives coordinating multiple single carrier average power control loops, to meet one total average EIRP threshold consistent with an exclusion zone, are not provided in existing systems. In particular, existing systems uses multiple single carrier/single cell control loops that each control the average power to be consistent with one static fraction of the total average EIRP threshold. This leads to a throughput degradation because of an inefficient use of the transmission headroom set by the total average EIRP threshold.

A third issue is that existing system do not provide a coordinating control algorithm to enable a joint control of all co-sited average power control loops to meet one total average EIRP threshold consistent with an exclusion zone. Such an algorithm may be based on novel control objectives.

A fourth issue is that existing systems do not provide for measurements of quantities related to the control objective.

However, it has been observed, as described herein, that the average power of the co-sited carriers are seldom high and close to the static thresholds in existing systems, simultaneously. Therefore, a co-sited carrier with high average power could temporarily use a single network node average power and then the statically computed threshold value, provided that the other co-sited carriers reduce their average powers correspondingly, which is described herein. Such a controller structure, in one or more embodiments described herein, may be strictly based on the measurement of a total combined power of all carriers using an AAS.

In other words, the teachings described herein provide for new functionality to help make deployment more flexible, while ensuring that RF EMF exposure limits are fulfilled, for network nodes that are equipped with advanced antenna systems (AASs). One or more embodiments described herein may be intended for millimeter-wave (mmW) network nodes, however the techniques may be applied also to low and mid band (LB and MB) network nodes and/or other systems. Further, one or more embodiments described herein may be suitable for network nodes equipped with functionality for measurement of the momentary transmit power close to the antenna array.

Before describing in detail example embodiments, it is noted that the embodiments reside primarily in combinations of apparatus components and processing steps related to dynamic RF EMF coordination of multiple carriers. In particular, in one or more embodiments, feedback of a total momentary carrier power associated with a plurality of co-sited carriers is used for controlling a respective power of each of the plurality of co-sited carriers, where the power may be an average power that may be controlled by varying an actuator that affects the momentary power by use of a resource limitation.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), coordinating controller node that may be part of the network node, power controller node that may be part of the network node, evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

As used herein in one or more embodiments, the average power threshold may correspond to one or more of a threshold, power threshold, average power threshold, EIRP threshold and average EIRP threshold.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a network node may be distributed over a plurality of network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide dynamic RF EMF coordination of multiple carriers using feedback of total momentary carrier power associated with a plurality of co-sited carriers.

Figure 9:
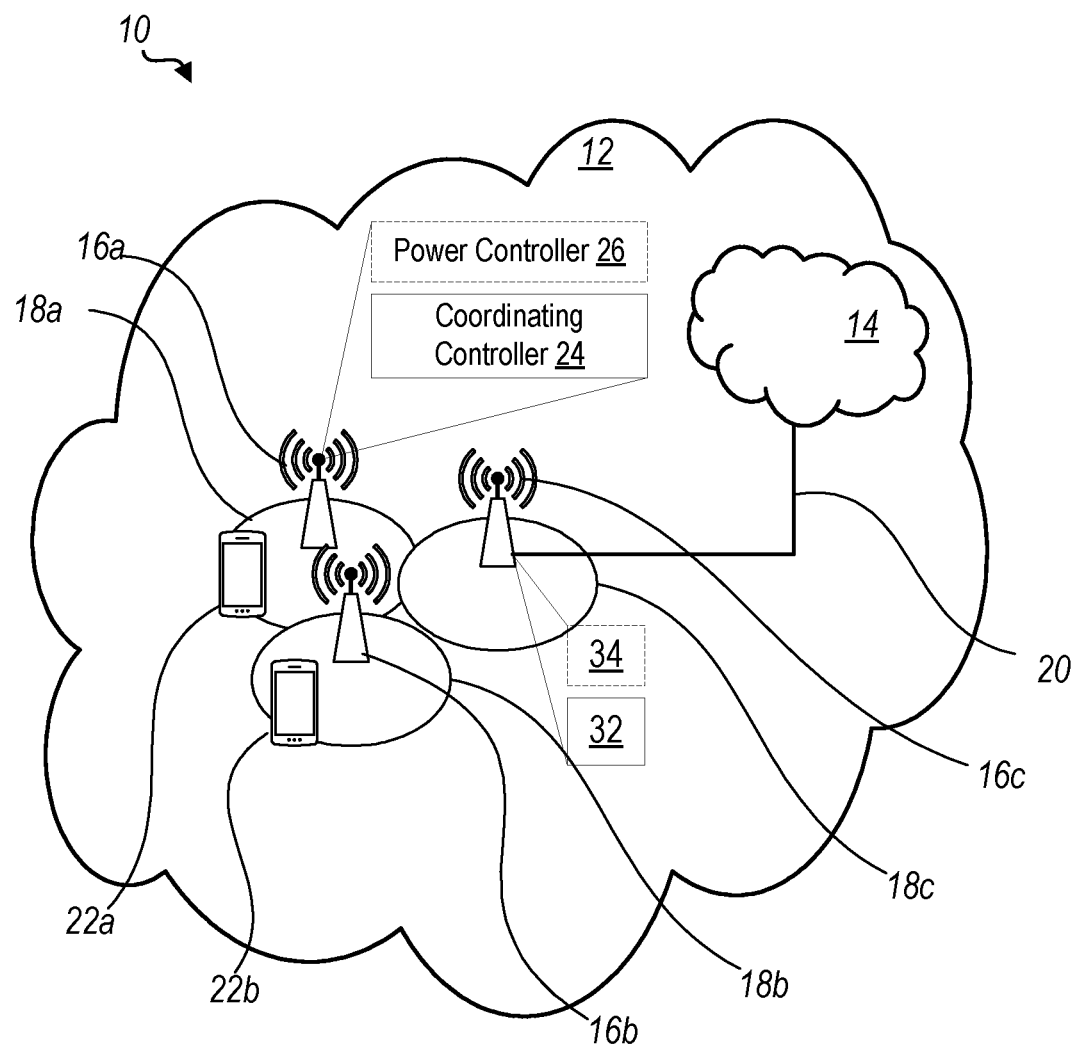
FIG. 9 is a schematic diagram of an example network architecture illustrating a communication system according to the principles in the present disclosure.

Referring again to the drawing figures, in which like elements are referred to by like reference numerals, there is shown in FIG. 9 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN. In one or more embodiments, multiple network nodes 16 may be co-located.

The communication system of FIG. 9 as a whole enables connectivity between WDs 22a, 22b and network nodes 16a-16b. A network node 16 may be configured to include a coordinating controller 26 which is configured to perform one or more network node 16 functions as described herein such as with respect to dynamic radio frequency (RF) electromagnetic field (EMF) coordination of multiple carriers. A network node is configured to includes power controller 26 which is configured to perform one or more network node 16 functions as described herein such as with respect to a power control loop for a carrier for dynamic RF EMF coordination of multiple carriers. In one or more embodiments, coordinating controller 24 may be omitted and/or disabled and/or not active such as if another network node 16 such as a central network node 16 is performing the coordinating functionality described herein. In one or more embodiments, coordinating controller 24 may be an entity separate from network node 16 such as a device co-located with one or more network nodes 16 and able to communicate with the network nodes 16.

Example implementations, in accordance with an embodiment, of the WD 22 and network node 16 discussed in the preceding paragraphs will now be described with reference to FIG. 10. In system 10, a network node 16 is provided that includes hardware 28 enabling it to communicate with the WD 22 and other network nodes 16. The hardware 28 may include a communication interface 30 for setting up and maintaining a wired or wireless connection with an interface of a different communication device such as other network nodes 16 of the communication system 10, as well as a radio interface 32 for setting up and maintaining at least a wireless connection 34 with a WD 22 located in a coverage area 18 served by the network node 16. The radio interface 32 may be formed as or may include, for example, one or more RF transmitters, one or more RF receivers, and/or one or more RF transceivers.

In the embodiment shown, the hardware 28 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16. For example, processing circuitry 36 of the network node 16 may include coordination controller 24 configured to perform one or more network node 16 functions as described herein such as with respect to dynamic RF EMF coordination of multiple carriers. The processing circuitry 36 may also include power controller 26 configured to perform one or more network node 16 functions as described herein such as with respect to dynamic power control for dynamic RF EMF coordination of multiple carriers.

The communication system 10 further includes the WD 22 already referred to. The WD 22 may have hardware 44 that may include a radio interface 46 configured to set up and maintain a wireless connection 34 with a network node 16 serving a coverage area 18 in which the WD 22 is currently located. The radio interface 46 may be formed as or may include, for example, one or more RF transmitters, one or more RF receivers, and/or one or more RF transceivers.

The hardware 44 of the WD 22 further includes processing circuitry 48. The processing circuitry 48 may include a processor 50 and memory 52. In particular, in addition to or instead of a processor, such as a central processing unit, and memory, the processing circuitry 48 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 50 may be configured to access (e.g., write to and/or read from) memory 52, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 54, which is stored in, for example, memory 52 at the WD 22, or stored in external memory (e.g., database, storage array, network storage device, etc.) accessible by the WD 22. The software 54 may be executable by the processing circuitry 48. The software 54 may include a client application 56. The client application 56 may be operable to provide a service to a human or non-human user via the WD 22. The client application 56 may interact with the user to generate the user data that it provides.

The processing circuitry 48 may be configured to control any of the methods and/or processes described herein and/or to cause such methods, and/or processes to be performed, e.g., by WD 22. The processor 50 corresponds to one or more processors 50 for performing WD 22 functions described herein. The WD 22 includes memory 52 that is configured to store data, programmatic software code and/or other information described herein. In some embodiments, the software 54 and/or the client application 56 may include instructions that, when executed by the processor 50 and/or processing circuitry 48, causes the processor 50 and/or processing circuitry 48 to perform one or more WD 22 processes.

Figure 10:
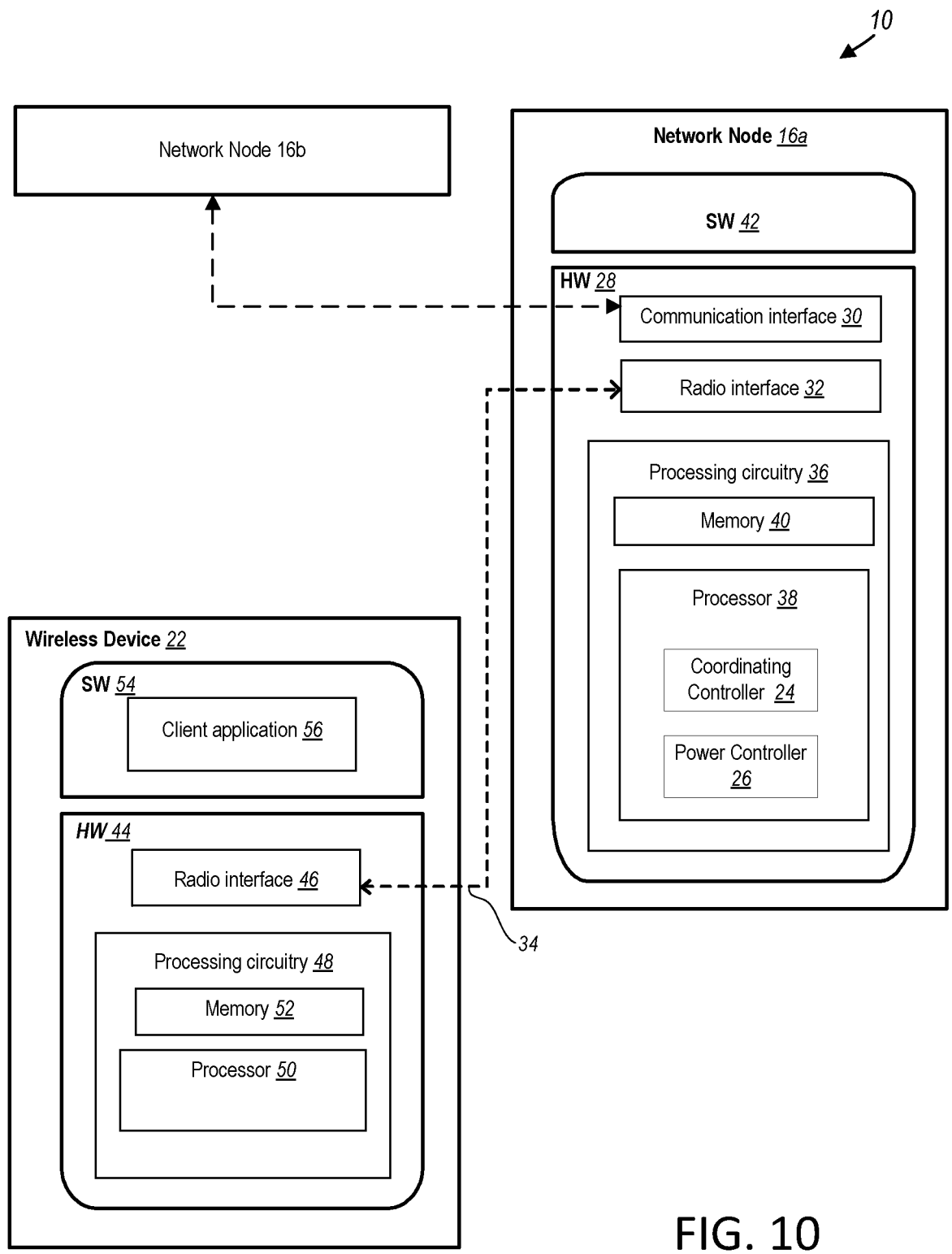
FIG. 10 is a block diagram of a network node and wireless device according to some embodiments of the present disclosure.

In some embodiments, the inner workings of the network node 16 and WD 22 may be as shown in FIG. 10 and independently, the surrounding network topology may be that of FIG. 9.

Although FIGS. 9 and 10 show various "controllers" such as coordinating controller 24 and power controller 26 as being within a respective processor, it is contemplated that these units/controllers may be implemented such that a portion of the controller is stored in a corresponding memory within the processing circuitry. In other words, the units may be implemented in hardware or in a combination of hardware and software within the processing circuitry.

Figure 11:
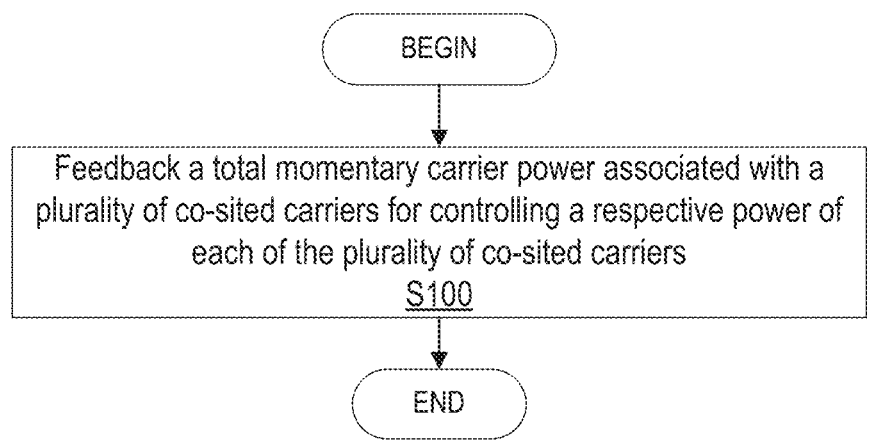
FIG. 11 is a flowchart of an example process in a network node according to some embodiments of the present disclosure.

FIG. 11 is a flowchart of an example process in a network node 16 according to some embodiments of the present disclosure. Network node 16 such as via one or more of processing circuitry 36, processor 38, radio interface 32, coordinating controller 24, etc., is configured to feedback (S100) a total momentary carrier power associated with a plurality of co-sited carriers for controlling a respective power of each of the plurality of co-sited carriers, as described herein.

According to one or more embodiments, the processing circuitry 36 is further configured to configure a plurality of scaling values where each scaling value is associated with a respective one of the plurality of co-sited carriers and is configured to scale the total momentary carrier power for generating a respective scaled average total power for controlling the respective power of the plurality of co-sited carriers. According to one or more embodiments, each scaling value is a respective fraction of an average total power associated with the plurality of co-sited carriers where the average total power is based at least on the total momentary carrier power. According to one or more embodiments, each scaling value is a proportional value of a long term average load for a respective carrier.

According to one or more embodiments, the feedback of the total momentary carrier power is configured to be provided to a plurality of average power control loops that are each configured to control a power of a respective one of the plurality of co-sited carriers and each configured to operate independent from each other. According to one or more embodiments, the total momentary carrier power is based on a total power associated with a plurality of radio circuits that are each configured to control a power of a respective one of the plurality of co-sited carriers. According to one or more embodiments, the feedback of the total momentary carrier power is configured to allow a total average power of the plurality of carriers to be maintained below a threshold. According to one or more embodiments, the feedback of the total momentary carrier power is configured to allow a respective dynamic power budget for each carrier. According to one or more embodiments, the respective power of each of the plurality of co-sited carriers is a respective average power of each of the plurality of co-sited carriers.

Figure 12:
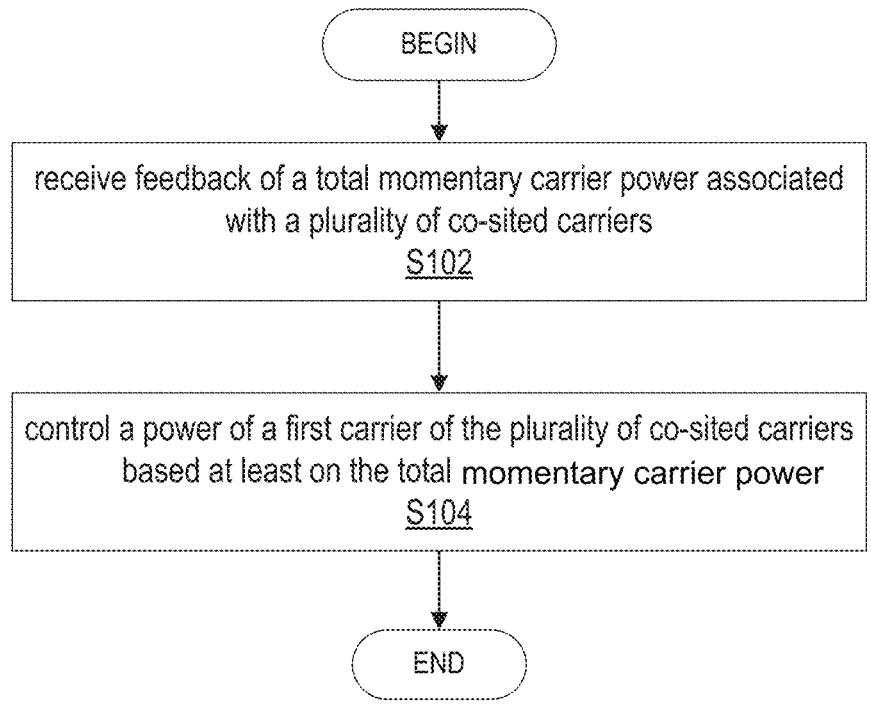
FIG. 12 is a flowchart of another example process in a network node according to some embodiments of the present disclosure.

FIG. 12 is a flowchart of another example process in a network node according to some embodiments of the present disclosure. Network node 16 such as via one or more of processing circuitry 36, processor 38, radio interface 32, power controller 26, etc., is configured to receive (S102) feedback of a total momentary carrier power associated with a plurality of co-sited carriers, as described herein. Network node 16 such as via one or more of processing circuitry 36, processor 38, radio interface 32, power controller 26, etc., is configured to control (S104) a power of a first carrier of the plurality of co-sited carriers based at least on the total momentary carrier power, as described herein.

According to one or more embodiments, the processing circuitry 36 is further configured to: receive a scaling value for scaling the total momentary carrier power; and generate a scaled average total power based at least on the scaled total momentary carrier power where the control of the power of the first carrier is based at least on the scaled average total power. According to one or more embodiments, the scaling value is a proportional value of a long term average load for a respective carrier. According to one or more embodiments, the processing circuitry 36 is further configured to operate an average power control loop for controlling the power of a first carrier based at least on the total momentary carrier power where the average power control loop is configured to operate independent of at least one other average power control loop associated with at least one other co-sited carrier of the plurality of co-sited carriers.

According to one or more embodiments, the total momentary carrier power is based on a total power associated with a plurality of radio circuits, a first radio circuit of the plurality of radio circuits being configured to control a power of the first carrier. According to one or more embodiments, the feedback of the total momentary carrier power is configured to allow a total average power of the plurality of carriers to be maintained below a threshold. According to one or more embodiments, the feedback of the total momentary carrier power is configured to allow a dynamic power budget for the first carrier. According to one or more embodiments, the power of the first carrier is an average power.

Having generally described arrangements for dynamic RF EMF coordination of multiple carriers using feedback of a total momentary carrier power, details for these arrangements, functions and processes are provided as follows, and which may be implemented by the network node 16.

Some embodiments provide dynamic RF EMF coordination of multiple carriers using feedback of a total momentary carrier power.

mmW Momentary Power Measurement Close to the Antenna

Radio ASIC Momentary Power

Assuming that there are M antenna elements per RFIC, it follows that the power per radio ASIC is $$P_{RFIC,frame} = \sum_{chain=1}^{M} P_{chain,frame}.$$

Radio Momentary Power

Assuming that there are L mmW radio ASICs per mmW radio, it follows that the total power equals $$P_{tot}(t) = \sum_{RFIC=1}^{L} P_{RFIC,frame}$$

Signaling to Base Band

Since the coordinating average power controller (i.e., coordinating controller 24) such as via one or more of processing circuitry 36, processor 38, radio interface 32, coordinating controller 24, etc., may operate in base band, one or more embodiments described herein teach signaling of $P_{tot}(t)$ or all $P_{RFIC,frame}$ from the radio to base band. In one or more embodiments, an interface between the measurement point of the power and the control algorithm is provided.

Summary of the Measurement Process

Figure 13:
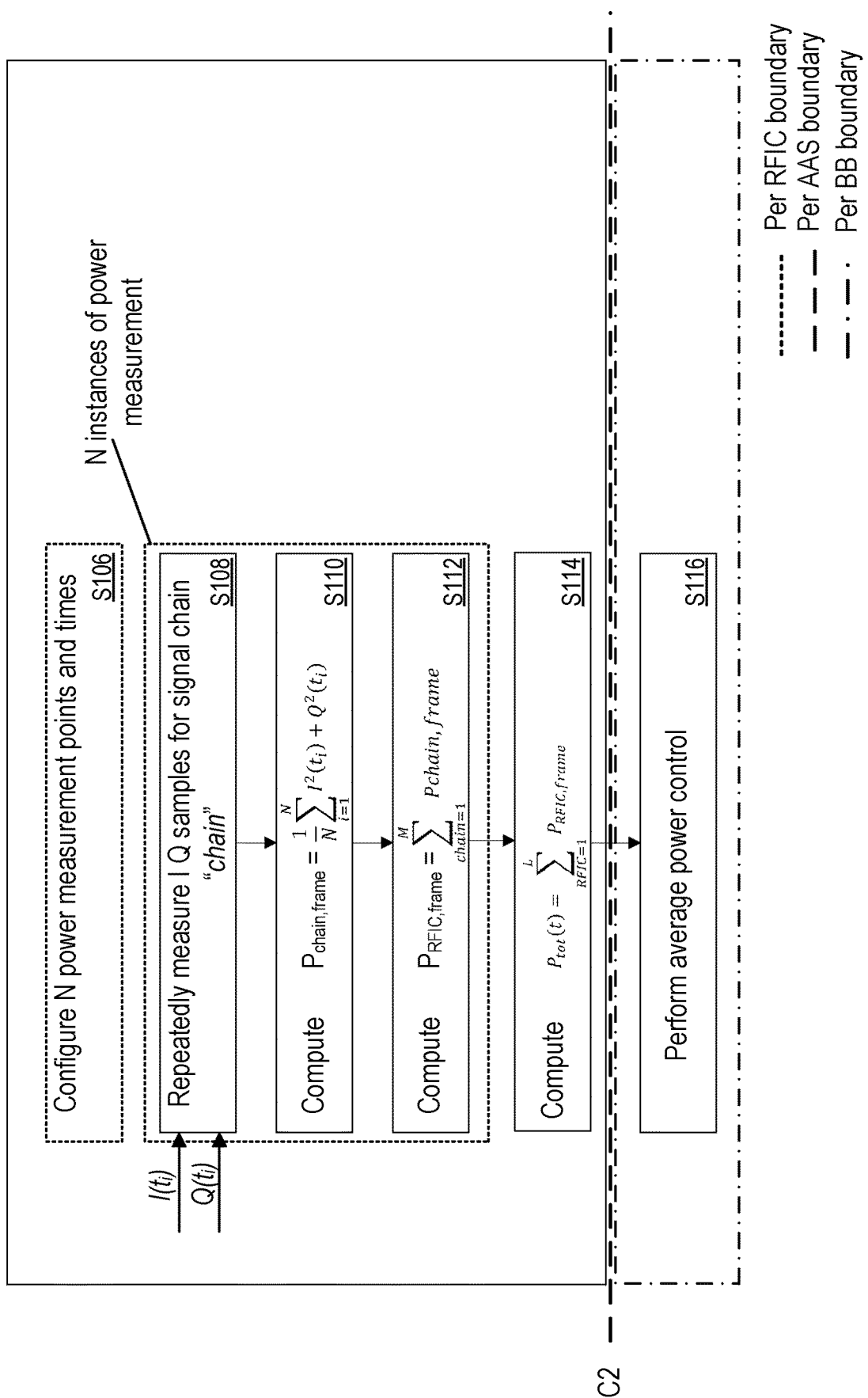
FIG. 13 is a flowchart of another example process in a network node according to some embodiments of the present disclosure.

An example of the radio momentary measurement process is illustrated in the flowchart of FIG. 13. The network node 16 such as via one or more of processing circuitry 36, processor 38, radio interface 32, coordinating controller 24, etc., is configured to configure (Block S106) N power measurement points for N times. The network node 16 such as via one or more of processing circuitry 36, processor 38, radio interface 32, coordinating controller 24, etc., is configured to repeatedly measure (Block S108) I Q samples for a signal chain. The network node 16 such as via one or more of processing circuitry 36, processor 38, radio interface 32, coordinating controller 24, etc., is configured to compute (Block S110)

$$P_{chain,frame} = \frac{1}{N} \sum_{i=1}^{N} I^2(t_i) + Q^2(t_i), .$$

The network node 16 such as via one or more of processing circuitry 36, processor 38, radio interface 32, coordinating controller 24, etc., is configured to compute (Block S112)

$$P_{RFIC,frame} = \sum_{chain=1}^{M} P_{chain,frame}.$$

The network node 16 such as via one or more of processing circuitry 36, processor 38, radio interface 32, coordinating controller 24, etc., is configured to compute (Block S114)

$$P_{tot}(t) = \Sigma_{RFIC=1}^{L} P_{RFIC,frame}.$$

The network node 16 such as via one or more of processing circuitry 36, processor 38, radio interface 32, coordinating controller 24, etc., is configured to perform (Block S116) average power control.

As used herein the RFIC (radio frequency IC), which may be part of processing circuitry 36, is used interchangeably with radio circuit, radio ASIC or ASIC. The per AAS boundary may also be denoted per radio boundary such that the teachings described herein may be applicable without an AAS attached to the radio.

Quantities Needed for MIMO RF EMF Average Power Control

Next, a situation with multiple carriers in a single network node 16 is described. Antenna array sharing is assumed for all carriers. It may be assumed that all involved carriers have implemented functionality for single node average power control, where the teachings described herein such as with respect to power controller 26 use a modified version of known single node average power control. One or more quantities may need to be known in order to provide a coordinating average EIRP controller that helps ensure that the average EIRP threshold is never exceeded, and at the same time does not unnecessarily restrict the momentary power per carrier, in case the total average EIRP threshold does not require this. It may be assumed that the coordinating average EIRP controller structure and mechanism is acting as a separate piece of software, based on a total average measured power in the radio. However, a new constraint expressed as a total maximum average EIRP may be needed, which together with new power and average EIRP control objectives. A new coordinating average EIRP control algorithm may also be needed.

A New MIMO Average EIRP Control Constraint to Meet RF EMF Exposure Limits

RF EMF Exposure

In the following, it is assumed that there are n co-sited carriers whose total power/EIRP may need to be controlled such as via one or more of processing circuitry 36, processor 38, radio interface 32, coordinating controller 24, etc. A further assumption is that the transmitted powers add up linearly in the following sense $$\sum_{i=1}^{n} P_i(t) G_i(t) = P_{EIRP,tot}(t)$$

where $P_i$ is the momentary power from carrier i, $G_i$ is the momentary beam gain of carrier i, and $P_{EIRP,tot}$ is the momentary EIRP of all n carriers.

Here, the subscript EIRP indicates that the quantity is an EIRP, in this case a momentary one, which is what is needed to relate to the transmit capability of a specific network node 16.

Now, as stated above, regulatory bodies typically specify the regulatory limits to be related to a time average over a time window T. In such a case the equation above reduces to $$\frac{1}{T}\int_{t-T}^{t}\sum_{i=1}^{n}P_i(\tau)G_i(\tau)d\tau = \sum_{i=1}^{n}\frac{1}{T}\int_{t-T}^{t}P_i(\tau)G_i(\tau)d\tau$$

A further simplification can be achieved in case the momentary antenna gain is reduced to the maximum antenna gain, $G_i$, of each contributing carrier, an approximation that amounts to handling a cell wide average power control loop. In that situation the above equation reduces to averaging of powers alone as $$\sum_{i=1}^{n}G_i\left(\frac{1}{T}\int_{t-T}^{t}P_i(\tau)d\tau\right) = \sum_{i=1}^{n}G_i\langle P_i\rangle(t).$$

Although covering a special case, this latter equation may be at the focal point in the coordinating average power controller development since it lends itself to a re-use of cell wide average power control.

New Coordinating Average EIRP Control Constraint

In order to optimize the transmission over the time T, a control is introduced for the above sum, where it is assumed that, e.g., deployment constraints lead to the constraint $$\sum_{i=1}^{n}G_i\langle P_i\rangle(t) = \mu P_{EIRP,max}$$

where μ is computed from the required RF EMF exclusion zone. The reference value of the controllers (i.e., power controller 26) for each average power controlled entity can then be used to define the following average EIRP control objective $$\Sigma_{i=1}^{n}G_i\langle P_{tot}\rangle_i^{ref}(t) = \varepsilon\mu P_{EIRP,max}.$$

Here ∈ is a factor slightly less than 1 needed to get control headroom.

New Coordinating Average EIRP Controller Implemented by, for Example, Coordinating Controller 24

The network node 16 such as via one or more of processing circuitry 36, processor 38, radio interface 32, coordinating controller 24, etc., builds on the new total momentary power feedback signal $P_{tot}(t)$, measured close to the antenna, as described herein. Whether, and then how, that signal may be jointly used by the existing individual per carrier average power controllers is described herein. To proceed, assume that the power controller 26 of each carrier is characterized by a maximum transmit power $P_i$,max and a maximum beam gain $G_i$ that result in a maximum EIRP, $$P_{EIRP,i,max} = P_{i,max}G_i.$$

Note that in case a grid of beams (GOB) transmission is used, it may be assumed that the maximum beam gain of each carrier is used for the majority of time.

The total maximum EIRP of all co-sited carriers is then $$P_{EIRP,max} = \sum_{i=1}^{n}P_{i,max}G_i.$$

A certain fraction of the total measured average power may then be used as the feedback signal to the single carrier average power control loops where all single carrier average power control loops are allowed to operate individually. To ensure that the total average EIRP threshold is met, control of their share of the total average power may be needed In that way, they Will act synchronously as a single total controller that guarantees that the total average EIRP threshold is met even though each power controller 26 is operating independently of other power controllers 26 receiving the feedback.

Will allow a varying and very different traffic in each separate carrier, thereby avoiding an unnecessary individual limitation of the traffic in each carrier due to a static power budget.

How to set the individual average power thresholds and the individual average power reference values will now be described.

The following fraction of the per carrier maximum EIRP to the total maximum EIRP of all carriers can be computed $$k_i = \frac{P_{EIRP,i,max}}{P_{EIRP,max}} = \frac{P_{i,max}G_i}{\sum_{i=1}^{n}P_{i,max}G_i}.$$

Same Beam Gain for all Carrier Control Loops

Assume that the maximum beam gain is the same for all i, and that the average power control loop of each carrier is configured with the reference value $$\langle P_{tot}\rangle_i^{ref}(t) = \frac{k_i\varepsilon\mu P_{EIRP,max}}{G},$$

It then follows that if it holds that $$\sum_{i=1}^{n}G_i\langle P_{tot}\rangle_i(t) = G\langle P_{tot}\rangle(t) = \varepsilon\mu P_{EIRP,max}$$

it follows that $$\langle P_{tot}\rangle_i^{ref}(t) - k_i\langle P_{tot}\rangle(t) = \frac{k_i\varepsilon\mu P_{EIRP,max}}{G} - k_i\frac{\varepsilon\mu P_{EIRP,max}}{G} = 0.$$

Therefore, with this reference value setting it follows that whenever the average EIRP equals the total reference value, then so does the average power for each individual control loop (i.e., control loop in the power controller 26). This holds provided that the measured fraction $k_i$ of $\langle P_{tot}\rangle$ (t) is used for feedback, and that the fraction $k_i$ of the total reference value $\varepsilon\mu P_{EIRP,max}$ is used for each separate carrier. By linearity, this implies that the single cell carrier loops may operate synchronously and solve the total average EIRP control problem for the multiple carriers, thereby always staying below the total EIRP threshold. In this case, throughput is not affected by the actual average power routed via each carrier such that only the sum may matter for EIRP purposes.

Different Beam Gains of the Carriers

In this case, the determination of the fractions $k_i$ becomes more complicated. It is again assumed that a situation occurs where the total EIRP reference value equation holds, i.e., $$\sum_{i=1}^{n} G_i \langle P_{tot} \rangle_i(t) = \varepsilon \mu P_{EIRP,max}.$$

Then, it may be required that this may imply that also the reference values are achieved for all single carrier average power control loops, i.e., that $$\langle P_{tot} \rangle_i^{ref}(t) - k_i \langle P_{tot} \rangle(t) = \frac{k_i \varepsilon \mu P_{EIRP,max}}{G_i} - k_i \langle P_{tot} \rangle(t) = 0$$

should hold for all i. Noting that the total equation can be modified into $$\langle P_{tot} \rangle(t) \sum_{i=1}^{n} G_i k_i = \varepsilon \mu P_{EIRP,max},$$

it follows that $$\langle P_{tot} \rangle_i^{ref}(t) - k_i \langle P_{tot} \rangle(t) =$$

$$\frac{k_i \varepsilon \mu P_{EIRP,max}}{G_i} - k_i \frac{\varepsilon \mu P_{EIRP,max}}{\sum_{i=1}^{n} G_i k_i} = \varepsilon \mu P_{EIRP,max} \left( \frac{k_i}{G_i} - \frac{k_i}{\sum_{i=1}^{n} G_i k_i} \right),$$

and therefore the design criterion is $$\frac{k_i}{G_i} - \frac{k_i}{\sum_{i=1}^{n} G_i k_i} = 0, \forall i.$$

If there exist $k_i$ such that the above equation holds, then the single carrier average power control loops also meet their set reference value. In one or more embodiments, an average power control loop may be provided by power controller 26. This holds provided that the measured fraction $k_i$ of $\langle P_{tot} \rangle$ (t) is used for feedback, and when the fraction $k_i$ of the total reference value $\varepsilon \mu P_{EIRP,max}$ is used for each separate carrier. By linearity, this implies that the single cell carrier loops may operate synchronously and solve the total average EIRP control problem for the multiple carriers, thereby always staying below the total EIRP threshold. In other words, in one or more embodiments, rather than making k_i fixed with respect to the power rating of each carrier, k_i is made proportional to the long term average load, thereby providing for dynamic adaptation of the power in one or more control loops. For example, power controller 26*i* for controller power of carrier i may be configured with a scaling value k_i for providing dynamic adaptation of the power.

Architecture

Figure 14:
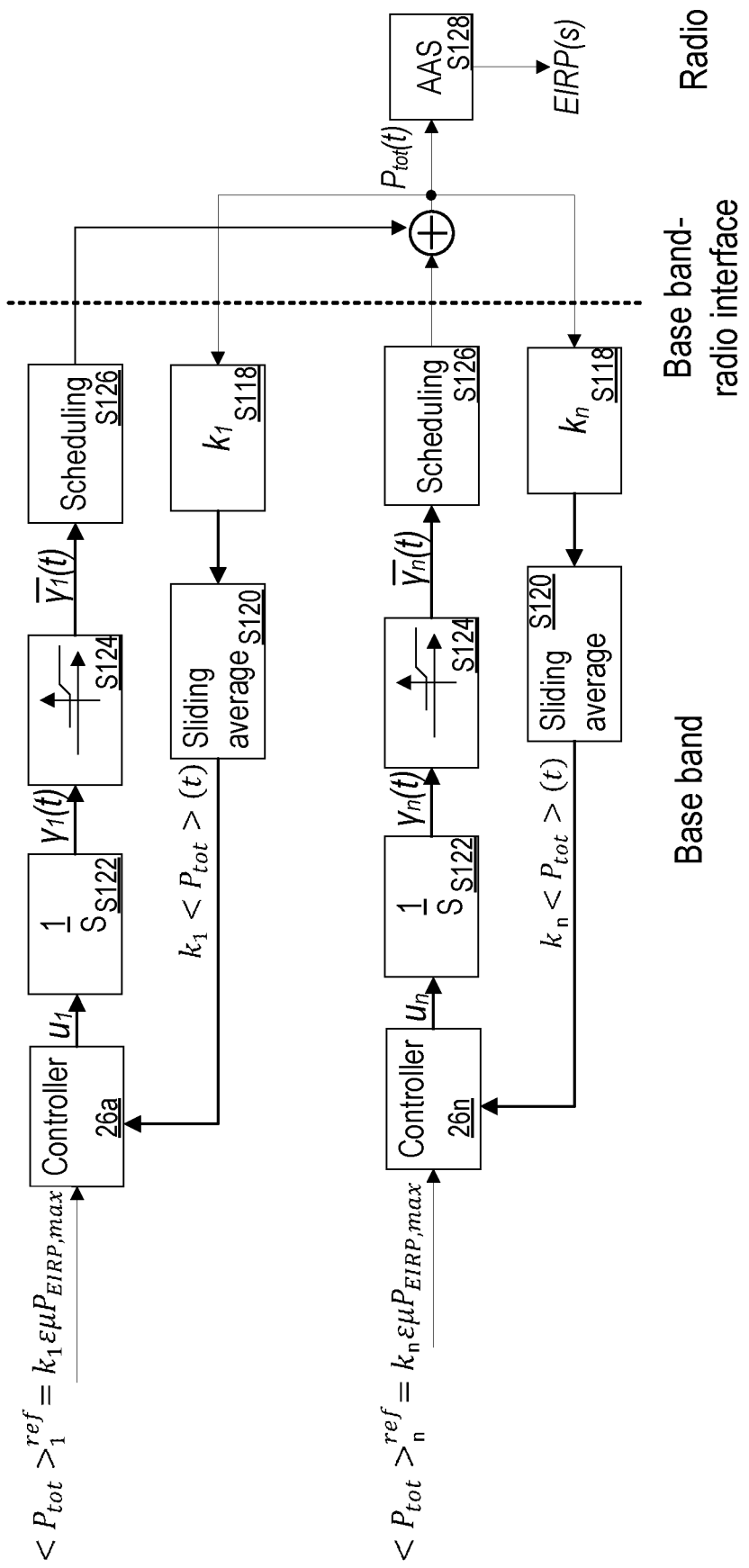
FIG. 14 is a diagram of an architecture for coordinating average EIRP according to some embodiments of the present disclosure.

The architecture of the cases outlined above is illustrated in FIG. 14. Various variants of the architecture shown in FIG. 14 are possible, including:

The order of the feedback scaling and sliding average blocks of each single carrier average power controller (i.e., power controller 26) can be interchanged.

The summation point of momentary carrier power may be located in the base band instead of as shown in the radio.

Parts of the momentary power summation between carriers may be performed in the radio and parts in the base band. This corresponds to whether the specific summation is performed by hardware located in the base band part of network node 16, or in the radio part of the network node 16.

In particular, staring from the feedback portion, coordinating controller 24 is configured to feedback $P_{tot}(t)$ to each power controller 26*a*-26*n* where each feedback path includes a respective feedback scaling Block S118 and a sliding average block S120 for output $k_i \langle P_{tot} \rangle$ (t) to power controller 26. Power controller 26 uses $k_i \langle P_{tot} \rangle$ (t) and $\rangle P_{tot} \rangle$ (t) to modify the power of a carrier$_i$. To explain the operation two examples are provided. In a first example (i.e., 50%-50% example) traffic corresponding to 50% of the power is processed/used by a first carrier and traffic corresponding to 50% of the power is processed/used by a second carrier. Setting the scaling factor/value (k) equal to 0.5 for both carriers, means that 50% of the total power (i.e., total momentary power, $P_{tot}(t)$) is used to compute the average power of each of the carriers, e.g., first carrier and second carrier. Since the reference values (i.e., $\langle P_{tot} \rangle^{ref}$) are also scaled by k, i.e., 0.5 in this example, each carrier will control its average power to be at most 50% of the total average power (or EIRP) threshold, thereby securing that 50%+50%=100% of the average power stays below the threshold.

Then consider a case (i.e., 100%-0% example) where 100% of the total power is fed through carrier 1 and 0% of the total power is fed through carrier 2. Then carrier 1 will measure 0.5 (i.e., example of k) * the total average power and also control towards 0.5* the reference value for the total power, i.e., when the total processed power is closely below the total threshold, carrier 1 will handle the situation alone and ensure that the total average power (EIRP) threshold is not exceeded. Carrier 2 will do the same, but since no traffic is passing using this carrier there will not be any effect on the throughput through that carrier. Therefore, the total allowed average power range is available for use by carrier 1, and no unnecessary throughput degradation occurs. Note that if a fixed division of power would have been used (no scaling), the throughput would have been reduced by 50% in this 100%-0% example.

Block S122 corresponds to actuator dynamics with lower and upper limits while Block S124 is configured to determine the scheduler limitation. The carrier is scheduled in Block S126. AAS is performed in Block S128.

Figure 15:
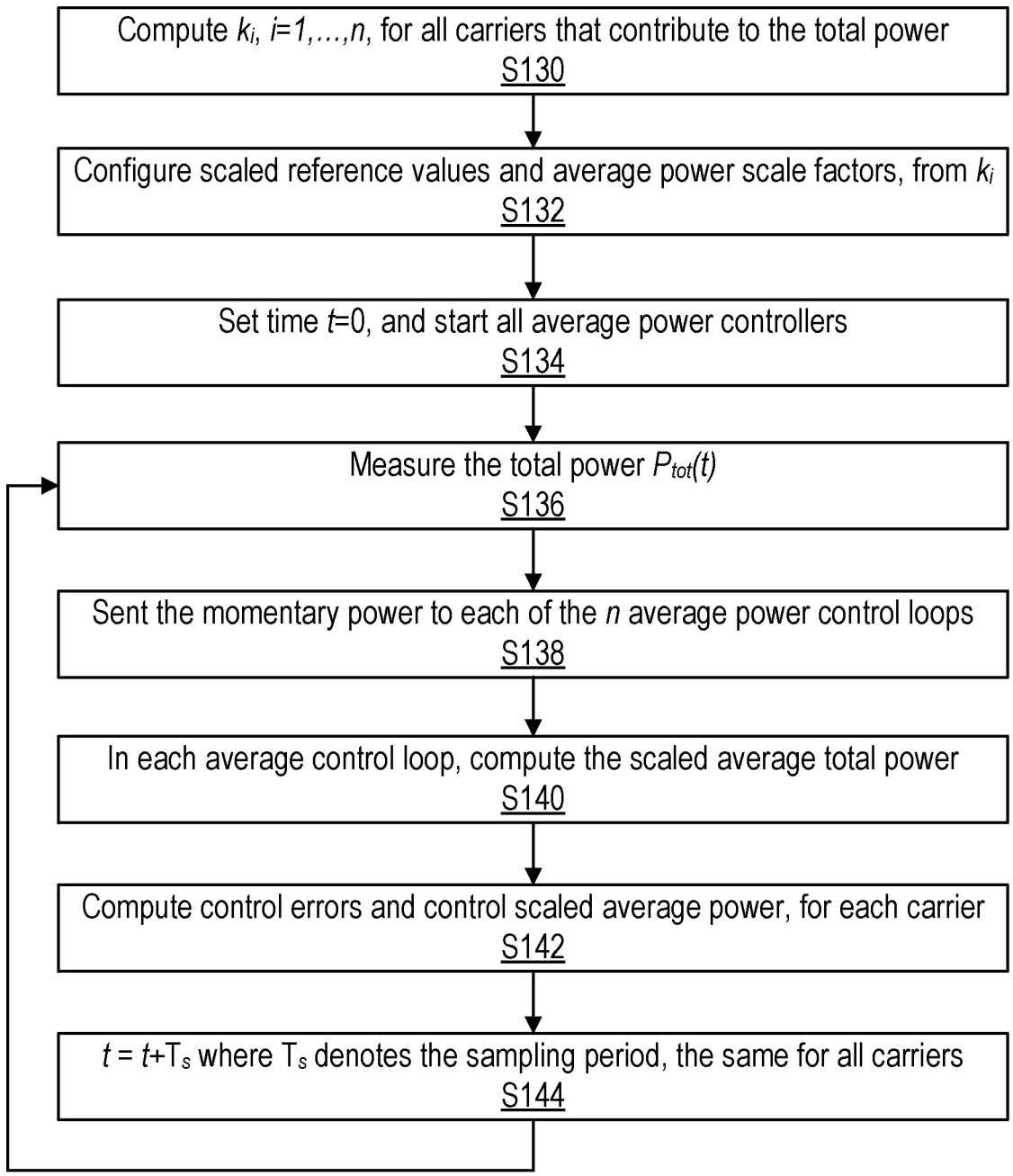
FIG. 15 is a flowchart of another example process in a network node according to some embodiments of the present disclosure.

FIG. 15 is a flowchart of an example process implemented by the network node 16 such as by coordinating controller 24. The network node 16 such as via one or more of processing circuitry 36, processor 38, radio interface 32, coordinating controller 24, etc., is configured to compute (Block S130) ki, i=1, . . . n, for all carriers that contribute to the total power. The network node 16 such as via one or more of processing circuitry 36, processor 38, radio interface 32, coordinating controller 24, etc., is configured to configure (Block S132) scaled reference values and average power scale factors from ki. The network node 16 such as via one or more of processing circuitry 36, processor 38, radio interface 32, coordinating controller 24, etc., is configured to set (Block S136) time=0, and starts all average power controllers (i.e., starts all power controllers 26).

The network node 16 such as via one or more of processing circuitry 36, processor 38, radio interface 32, coordinating controller 24, etc., is configured to measure (Block S136) the total power Ptot(t). The network node 16 such as via one or more of processing circuitry 36, processor 38, radio interface 32, coordinating controller 24, etc., is configured to send (Block S138) the monetary power to each of the n average power control loops, thereby allowing each average control loop to compute the scaled average total power.

The network node 16 such as via one or more of processing circuitry 36, processor 38, radio interface 32, coordinating controller 24, etc., is configured to compute (Block S140) a scaled average total power for each average control loop. The network node 16 such as via one or more of processing circuitry 36, processor 38, radio interface 32, coordinating controller 24, etc., is configured to compute (S142) control errors and control a scaled average power, for each carrier for each control loop. The network node 16 such as via one or more of processing circuitry 36, processor 38, radio interface 32, coordinating controller 24, etc., is configured to set (Block S144) t=t+T where T denotes the sampling period, the same for all carriers.

Therefore, one or more embodiments include and/or use one or more of the following:

The new total momentary power measurement method on the radio circuit, e.g., radio ASIC.

The reporting of the total momentary power, from the radio (i.e., coordinating controller 24) to the per carrier average power controller (i.e., power controller 26).

The use of a configured (or adaptive) fraction ($k_i$) of the average total power measured in the radio as feedback signal.

The use of a configured fraction (k_i) of the total average EIRP reference value that may be dictated by the selected exclusion zone.

Various methods for selection of k_i.

Determination of the per carrier reference value.

Therefore, one or more embodiments described herein provide a way to enhance the performance of AAS equipped network nodes 16, for LB, MB and HB products such as for HB generation 3 network nodes 16 (TYRA based) and later as compared with existing solutions. Enhancements which may result may include one or more of the following:

The throughput is enhanced for separately scheduled co-sited aggregated carriers, while helping guarantee that the total average power/EIRP of a network nodes 16 is maintained below a threshold determined to obtain a certain RF EMF exclusion zone.

The exclusion zone may be reduced for separately scheduled co-sited aggregated carriers, while helping guarantee that the total average EIRP of a network nodes 16 is maintained below the determined threshold. This facilitates deployment of AAS radios with carrier aggregation.

The configuration of an average power threshold per sector-carrier in existing systems may be replaced by an automated procedure which is advantageous for CA in NR based entities/devices.

The implementation complexity is minimal, by a reuse of per-carrier average power controllers that are configured according to the teachings described herein.

The accuracy may be improved by using near antenna power measurements.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node, comprising:
   processing circuitry configured to:
   feedback a total momentary carrier power associated with a plurality of co-sited carriers for controlling a respective power of each of the plurality of co-sited carriers; and
   configure a plurality of scaling values, each scaling value being associated with a respective one of the plurality of co-sited carriers and being configured to scale the total momentary carrier power for generating a respective scaled average total power for controlling the respective power of the plurality of co-sited carriers.

2. The network node of claim 1, wherein each scaling value is a respective fraction of an average total power associated with the plurality of co-sited carriers, the average total power being based at least on the total momentary carrier power.

3. The network node of claim 1, wherein each scaling value is a proportional value of a long term average load for a respective carrier.

4. The network node of claim 1, wherein the feedback of the total momentary carrier power is configured to be provided to a plurality of average power control loops that are each configured to control a power of a respective one of the plurality of co-sited carriers and each configured to operate independent from each other.

5. The network node of claim 1, wherein the total momentary carrier power is based on a total power associated with a plurality of radio circuits that are each configured to control a power of a respective one of the plurality of co-sited carriers.

6. The network node of claim 1, wherein the feedback of the total momentary carrier power is configured to allow a total average power of the plurality of carriers to be maintained below a threshold.

7. The network node of claim 1, wherein the feedback of the total momentary carrier power is configured to allow a respective dynamic power budget for each carrier.

8. The network node of claim 1, wherein the respective power of each of the plurality of co-sited carriers is a respective average power of each of the plurality of co-sited carriers.

9. A method for a network node, the method comprising:
   feeding back a total momentary carrier power associated with a plurality of co-sited carriers for controlling a respective power of each of the plurality of co-sited carriers; and
   configuring a plurality of scaling values, each scaling value being associated with a respective one of the plurality of co-sited carriers and being configured to scale the total momentary carrier power for generating a respective scaled average total power for controlling the respective power of the plurality of co-sited carriers.

10. The method of claim 9, wherein each scaling value is a respective fraction of an average total power associated with the plurality of co-sited carriers, the average total power being based at least on the total momentary carrier power.

11. The method of claim 9, wherein each scaling value is a proportional value of a long term average load for a respective carrier.

12. The method of claim 9, wherein the feedback of the total momentary carrier power is configured to be provided to a plurality of average power control loops that are each configured to control a power of a respective one of the plurality of co-sited carriers and each configured to operate independent from each other.

13. The method of claim 9, wherein the total momentary carrier power is based on a total power associated with a plurality of radio circuits that are each configured to control a power of a respective one of the plurality of co-sited carriers.

14. The method of claim 9, wherein the feedback of the total momentary carrier power is configured to allow a total average power of the plurality of carriers to be maintained below a threshold.

15. The method of claim 9, wherein the feedback of the total momentary carrier power is configured to allow a respective dynamic power budget for each carrier.

16. The method of claim 9, wherein the respective power of each of the plurality of co-sited carriers is a respective average power of each of the plurality of co-sited carriers.

* * * * *